US011169809B2

(12) United States Patent
Plotnikov

(10) Patent No.: US 11,169,809 B2
(45) Date of Patent: Nov. 9, 2021

(54) METHOD AND APPARATUS FOR CONVERTING SCATTER CONTROL ELEMENTS TO GATHER CONTROL ELEMENTS USED TO SORT VECTOR DATA ELEMENTS

(71) Applicant: Intel Corporation, Santa Clara, CA (US)

(72) Inventor: Mikhail Plotnikov, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/490,357

(22) PCT Filed: Mar. 31, 2017

(86) PCT No.: PCT/RU2017/000195
§ 371 (c)(1),
(2) Date: Aug. 30, 2019

(87) PCT Pub. No.: WO2018/182445
PCT Pub. Date: Oct. 4, 2018

(65) Prior Publication Data
US 2020/0073659 A1 Mar. 5, 2020

(51) Int. Cl.
G06F 9/30 (2018.01)
(52) U.S. Cl.
CPC ........ G06F 9/3016 (2013.01); G06F 9/30018 (2013.01); G06F 9/30036 (2013.01); G06F 9/30101 (2013.01)
(58) Field of Classification Search
None
See application file for complete search history.

(56) References Cited

U.S. PATENT DOCUMENTS 5,544,337 A * 8/1996 Beard ............... G06F 8/433
712/222
5,623,650 A * 4/1997 Beard ............... G06F 9/30149
712/234

(Continued)

FOREIGN PATENT DOCUMENTS

WO WO-2013048368 A1 * 4/2013 ......... G06F 15/8061
WO 2014/150636 A1 9/2014
WO WO-2017163024 A1 * 9/2017 ......... G06F 9/30072

OTHER PUBLICATIONS

International Preliminary Report on Patentability, PCT App. No. PCT/RU2017/000195, dated Oct. 10, 2019, 15 pages.

(Continued)

Primary Examiner — Steven G Snyder
(74) Attorney, Agent, or Firm — Nicholson De Vos Webster & Elliott LLP

(57) ABSTRACT

Method and apparatus for converting scatter control elements to gather control elements used to permute vector data elements is described herein. One embodiment of a method includes decoding an instruction having a field for a source vector operand storing a plurality of data elements, wherein each of the data element includes a set bit and a plurality of unset bits. Each of the set bits is set at a unique bit offset within the respective data element. The method further includes executing the decoded instruction by generating, for each bit offset across the plurality of data elements in the source vector operand, a count of unset bits between a first data element having a bit set at a current bit offset and a second data element comprising a least significant bit (LSB). A set of control elements is generated based on the count of unset bits generated for each bit offset.

16 Claims, 24 Drawing Sheets

(56) References Cited

U.S. PATENT DOCUMENTS

| | | | | |
|---|---|---|---|---|
| 5,640,524 | A * | 6/1997 | Beard | G06F 8/433 |
| | | | | 712/222 |
| 7,212,531 | B1 * | 5/2007 | Kopelman | H04L 45/00 |
| | | | | 370/392 |
| 7,230,956 | B1 * | 6/2007 | Ambrose | H04J 3/0605 |
| | | | | 370/503 |
| 8,752,029 | B2 * | 6/2014 | Gulwani | G06F 11/3089 |
| | | | | 717/131 |
| 9,411,584 | B2 * | 8/2016 | Hughes | G06F 9/30032 |
| 9,411,592 | B2 * | 8/2016 | Valentine | G06F 9/30036 |
| 9,639,354 | B2 * | 5/2017 | Abraham | G06F 9/30036 |
| 9,747,101 | B2 * | 8/2017 | Ould-Ahmed-Vall | ......... |
| | | | | G06F 9/3887 |
| 9,898,283 | B2 * | 2/2018 | Abraham | G06F 9/30167 |
| 9,904,547 | B2 * | 2/2018 | Ould-Ahmed-Vall | ......... |
| | | | | G06F 9/30032 |
| 10,042,814 | B2 * | 8/2018 | Sprangle | G06F 9/30043 |
| 10,203,955 | B2 * | 2/2019 | Valentine | G06F 9/30018 |
| 10,565,283 | B2 * | 2/2020 | Abraham | G06F 17/10 |
| 10,768,895 | B2 * | 9/2020 | Connor | G06F 7/523 |
| 10,866,807 | B2 * | 12/2020 | Ould-Ahmed-Vall | ......... |
| | | | | G06F 9/30018 |
| 2011/0078665 | A1 * | 3/2011 | Gulwani | G06F 11/3089 |
| | | | | 717/131 |
| 2013/0275482 | A1 * | 10/2013 | Abraham | G06F 9/30036 |
| | | | | 708/200 |
| 2013/0275727 | A1 * | 10/2013 | Abraham | G06F 9/30167 |
| | | | | 712/221 |
| 2013/0275729 | A1 * | 10/2013 | Abraham | G06F 9/30036 |
| | | | | 712/221 |
| 2013/0283018 | A1 * | 10/2013 | Ould-Ahmed-Vall | ......... |
| | | | | G06F 9/30167 |
| | | | | 712/225 |
| 2013/0283019 | A1 * | 10/2013 | Ould-Ahmed-Vall | ......... |
| | | | | G06F 9/30181 |
| | | | | 712/225 |
| 2014/0189307 | A1 * | 7/2014 | Valentine | G06F 9/30145 |
| | | | | 712/208 |
| 2014/0189308 | A1 * | 7/2014 | Hughes | G06F 9/30145 |
| | | | | 712/208 |
| 2014/0189309 | A1 | 7/2014 | Hughes et al. | |
| 2014/0201498 | A1 * | 7/2014 | Ould-Ahmed-Vall | ......... |
| | | | | G06F 9/3887 |
| | | | | 712/4 |
| 2014/0244969 | A1 * | 8/2014 | Tagaya | G06F 17/16 |
| | | | | 712/7 |
| 2015/0074354 | A1 * | 3/2015 | Sprangle | G06F 9/30098 |
| | | | | 711/125 |
| 2016/0188336 | A1 * | 6/2016 | Valentine | G06F 9/30109 |
| | | | | 712/5 |
| 2017/0357514 | A1 * | 12/2017 | Ould-Ahmed-Vall | ......... |
| | | | | G06F 9/30145 |
| 2020/0150926 | A1 * | 5/2020 | Connor | G06F 9/30018 |
| 2020/0320016 | A1 * | 10/2020 | Breslow | G06F 12/1009 |

OTHER PUBLICATIONS

International Search Report and Written Opinion, PCT Patent Appl. No. PCT/RU2017/000195, dated Dec. 21, 2017, 16 pages.

European Office Action, EP App. No. 17731323.6, dated Aug. 4, 2021, 9 pages.

* cited by examiner

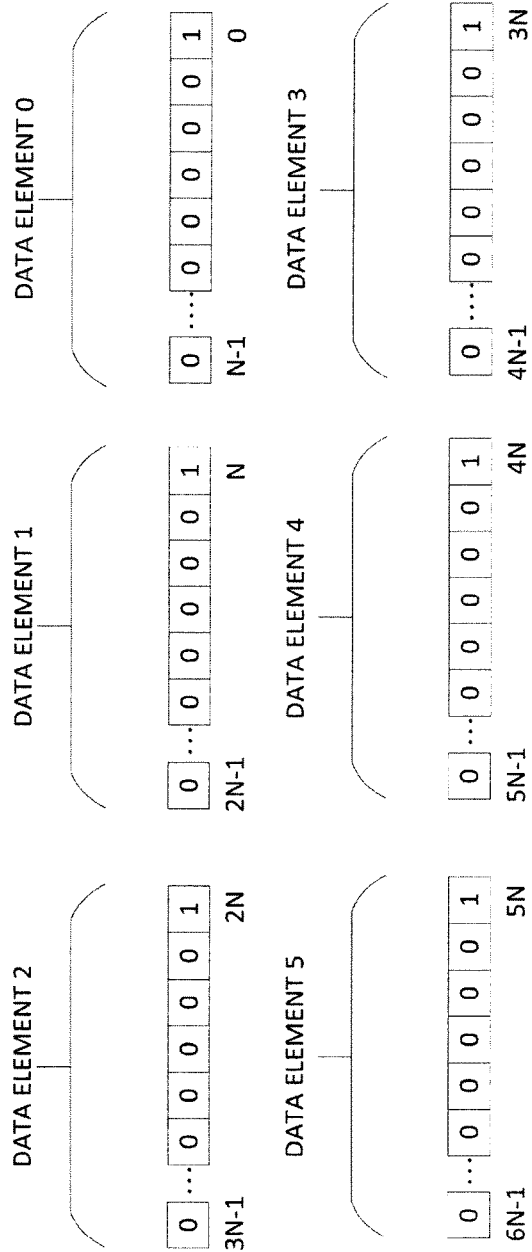
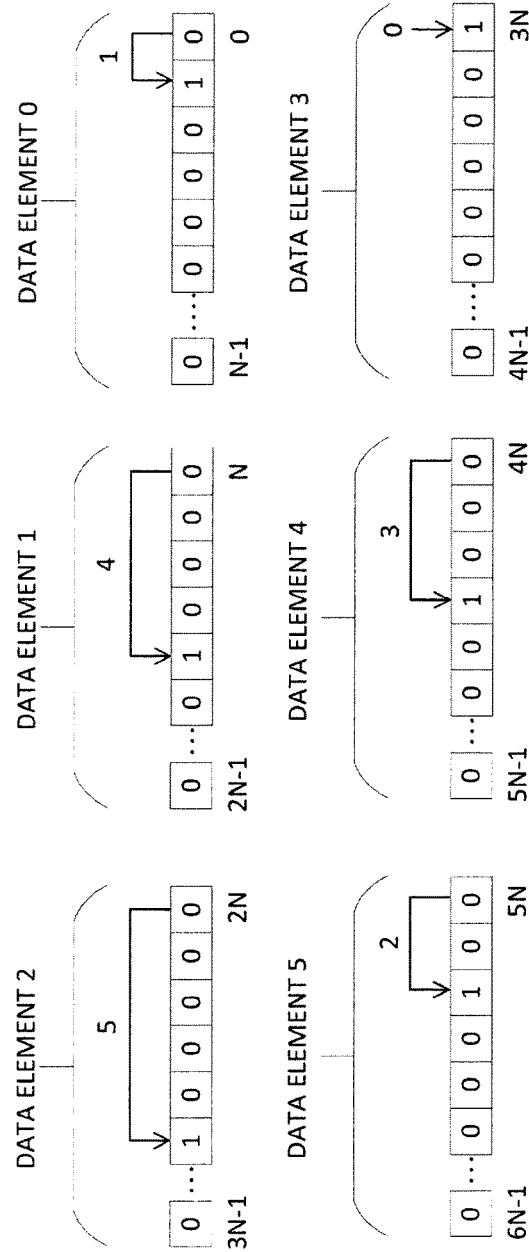
FIG. 6A
FIG. 6B

FIG. 8A

DATA ELEMENT 5

| 0 | ···· | 0 | 0 | 0 | 1 | 0 | 0 |
|---|---|---|---|---|---|---|---|

6N-1                          5N

TMP

| 1 | 1 | 1 | 0 | 1 | 1 |
|---|---|---|---|---|---|

DATA ELEMENT 4

| 0 | ···· | 0 | 0 | 1 | 0 | 0 | 0 |
|---|---|---|---|---|---|---|---|

5N-1                          4N

TMP

| 2 | 2 | 0 | 1 | 2 | 2 |
|---|---|---|---|---|---|

DATA ELEMENT 3

| 0 | ···· | 0 | 0 | 0 | 0 | 0 | 1 |
|---|---|---|---|---|---|---|---|

4N-1                          3N

TMP

| 3 | 3 | 1 | 2 | 3 | 0 |
|---|---|---|---|---|---|

DATA ELEMENT 2

| 0 | ···· | 1 | 0 | 0 | 0 | 0 | 0 |
|---|---|---|---|---|---|---|---|

3N-1                          2N

TMP

| 0 | 4 | 2 | 3 | 4 | 1 |
|---|---|---|---|---|---|

DATA ELEMENT 1

| 0 | ···· | 0 | 1 | 0 | 0 | 0 | 0 |
|---|---|---|---|---|---|---|---|

2N-1                          N

TMP

| 1 | 0 | 3 | 4 | 5 | 2 |
|---|---|---|---|---|---|

DATA ELEMENT 0

| 0 | ···· | 0 | 0 | 0 | 0 | 1 | 0 |
|---|---|---|---|---|---|---|---|

N-1                          0

TMP                      810

| 2 | 1 | 4 | 5 | 0 | 3 |
|---|---|---|---|---|---|

KL-1                0

5   4   3   2   1   0   DATA ELEMENT (INDEX)
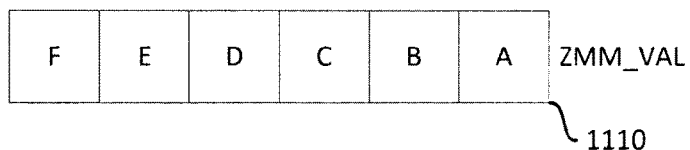
ZMM_VAL
1110
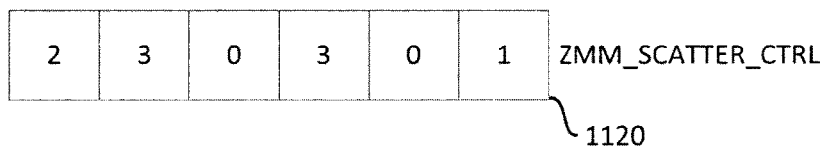
ZMM_SCATTER_CTRL
1120
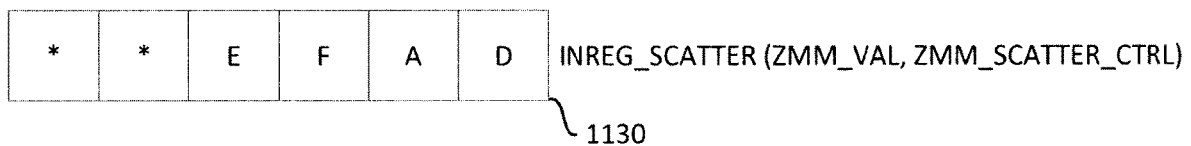
INREG_SCATTER (ZMM_VAL, ZMM_SCATTER_CTRL)
1130
FIG. 11

METHOD AND APPARATUS FOR CONVERTING SCATTER CONTROL ELEMENTS TO GATHER CONTROL ELEMENTS USED TO SORT VECTOR DATA ELEMENTS

BACKGROUND

Field of the Invention

This invention relates generally to the field of computer processors. More particularly, the invention relates to a method and apparatus for converting scatter control elements to gather control elements used to sort vector data elements.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6A-6B illustrates an exemplary shift instruction according to an embodiment;

FIG. 8A-8F illustrates the use of a set of counters in a temporary register in accordance to an embodiment;

FIG. 11 illustrates an example of sorting and/or permuting a plurality of packed vector data elements using a scatter instruction that includes duplicate scatter control elements;

DETAILED DESCRIPTION

Embodiments of method and apparatus for converting scatter control elements to gather control elements used to sort vector data elements is described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Sorting data elements packed in a vector is a crucial functionality in modern single instruction, multiple data (SIMD) vector processors and, understandably, there are many ways in which the sorting functionality may be implemented. One of such implementations involve the use of an in-register scatter instruction, which can permute or rearrange packed vector data elements in a register based on a set of scatter control elements. The set of scatter control elements may be produced by another instruction or may be generated based on a comparison of keys at a certain stage of a sorting sequence. However, in many current and known future instruction set architectures (ISAs), a true in-register scatter instruction, also known as a push-permute, does not exist. One of the reasons being that such primitive is hard to implement due to the cross-lane writes that are often involved, such as reading control from i-lane of source operand and writing the result to different k-lane of the destination operand. To get around this issue, in-register scatter is often emulated by using existing primitives and/or primitives that can be more easily implemented. Aspects of the invention describe method and apparatus for emulating an in-register scatter instruction by using an in-register gather instruction. In some embodiments, a set of scatter control elements to be used in a scatter instruction is converted to a set of gather control elements, which is then used by a gather instruction to perform the desired permutation of packed vector data elements stored in a vector register.

Figure 1:
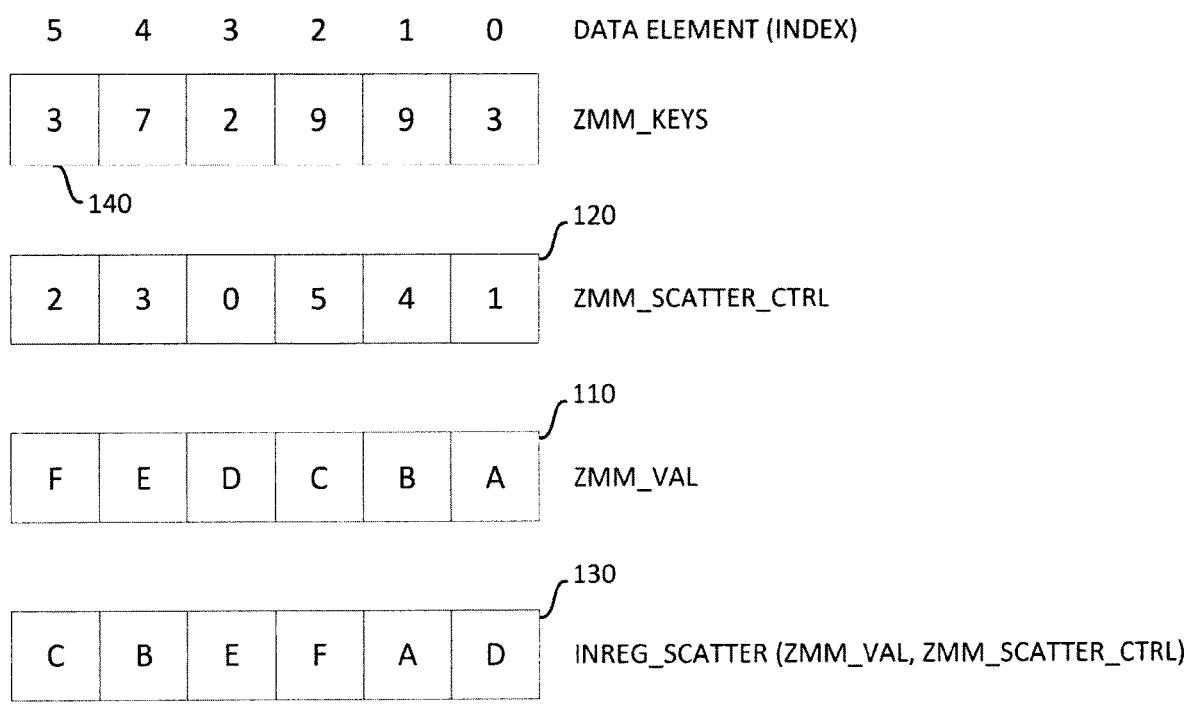
FIG. 1 illustrates an example of sorting and/or permuting a plurality of packed vector data elements using a scatter instruction.

FIG. 1 illustrates an example of sorting/permuting a plurality of packed vector data elements using a scatter instruction. A scatter instruction takes as input a plurality of source vector data elements (e.g., A-F) stored in a source vector register (zmm_val) 110 and copies them into a destination register 130. The respective position in the destination register 130 to which each of the source vector data element is to be copied is specified by a set of scatter control elements stored in a scatter control register (zmm_scatter_ctre 120. In some cases, the set of scatter control elements is determined by, or generated from, a set of keys or key values stored in a key register (zmm_keys) 140. For instance, in the example illustrated in FIG. 1, the smallest key value stored in the key register 140 is the value "2" at index position 3. Accordingly, the corresponding scatter control element at index position 3 of the scatter control register 120 is set to "0". The next smallest key value stored in the key register 140 is the value "3" that appears in both index position 0 and index position 5 of the key register 140. As such, the corresponding scatter control elements at index position 0 and 5 of the scatter control register 120 are set to 1 and 2, respectively. The reason being that in the example illustrated in FIG. 1, duplicate key values are resolved based on their respective index position within the key register 140 such that their relative order is preserved and reflected by the order of their corresponding control elements in the scatter control register 120. Of course, other method of resolving duplicates key values, as well as other methods for deriving scatter control elements from a set of key values, may also be used. The manner in which the scatter control elements are generated does not affect the underlying principles of the present invention. According to some embodiments, each of the scatter control elements stored in a scatter control register represent a unique value in the range of 0 to KL−1, where KL is the number of source vector data elements in the source vector. In such embodiments, the scatter control elements can be ordered based on their respective value. In other embodiments, there may be duplicate (i.e. non-unique) values among the scatter control elements. Returning to the set of key values stored in key register 140, the next smallest key value is "7" stored at index position 4. Accordingly, the corresponding scatter control element at position 4 is set to 3. This process repeats until every key in the keys register 110 has been accounted for, resulting in a set of scatter control elements stored in the scatter control register 120.

Each of the scatter control elements, whether generated from a set of keys or provided by a user and/or another instruction, corresponds to one of the source data elements (e.g., A-F) stored in source vector register 110 and is used to identify the position in the destination register 130 to which the corresponding source vector data element is to be copied. For instance, scatter control value "1" at index position 0 of the scatter control register 120 corresponds to source data element "A" at index position 0 of the source vector register 110. The scatter control value "1" identifies/indicates the position in the destination register 130 to which the source data element "A" is to be copied (i.e., index position 1). Next, the scatter control value "4" corresponds to source data element "B" in the same index position of the source vector register 110 and identifies index position 4 in the destination register 130 as the location where source element "B" is to be copied to. The next scatter control element "5" corresponds to a source data element "C" and is used to identify index position 5 in the destination register and so on. Due to difficulty involved in performing cross-lane writes where the in-register scatter instruction has to read control from i-lane of source operand and write the result to different k-lane of the destination operand, in-register scatter instruction is sometimes emulated by using a combination of other instructions that can be more easily implemented while still achieving the same results.

According to an embodiment, one way to emulate the results of an in-register scatter instruction is to execute the in-register scatter instruction as an in-register gather instruction. An in-register gather instruction, such as the VPERM instruction developed by Intel Corporation of Santa Clara, Calif., is an existing primitive found in many ISAs. However, in order to execute an in-register scatter instruction as an in-register gather instruction, the set of scatter control elements associated with the in-register scatter instruction has to be converted into a set of gather control elements to be used as input to the in-register gather instruction. Aspects of the present invention provides a method and apparatus for executing an in-register scatter instruction as an in-register gather instruction.

Figure 2:
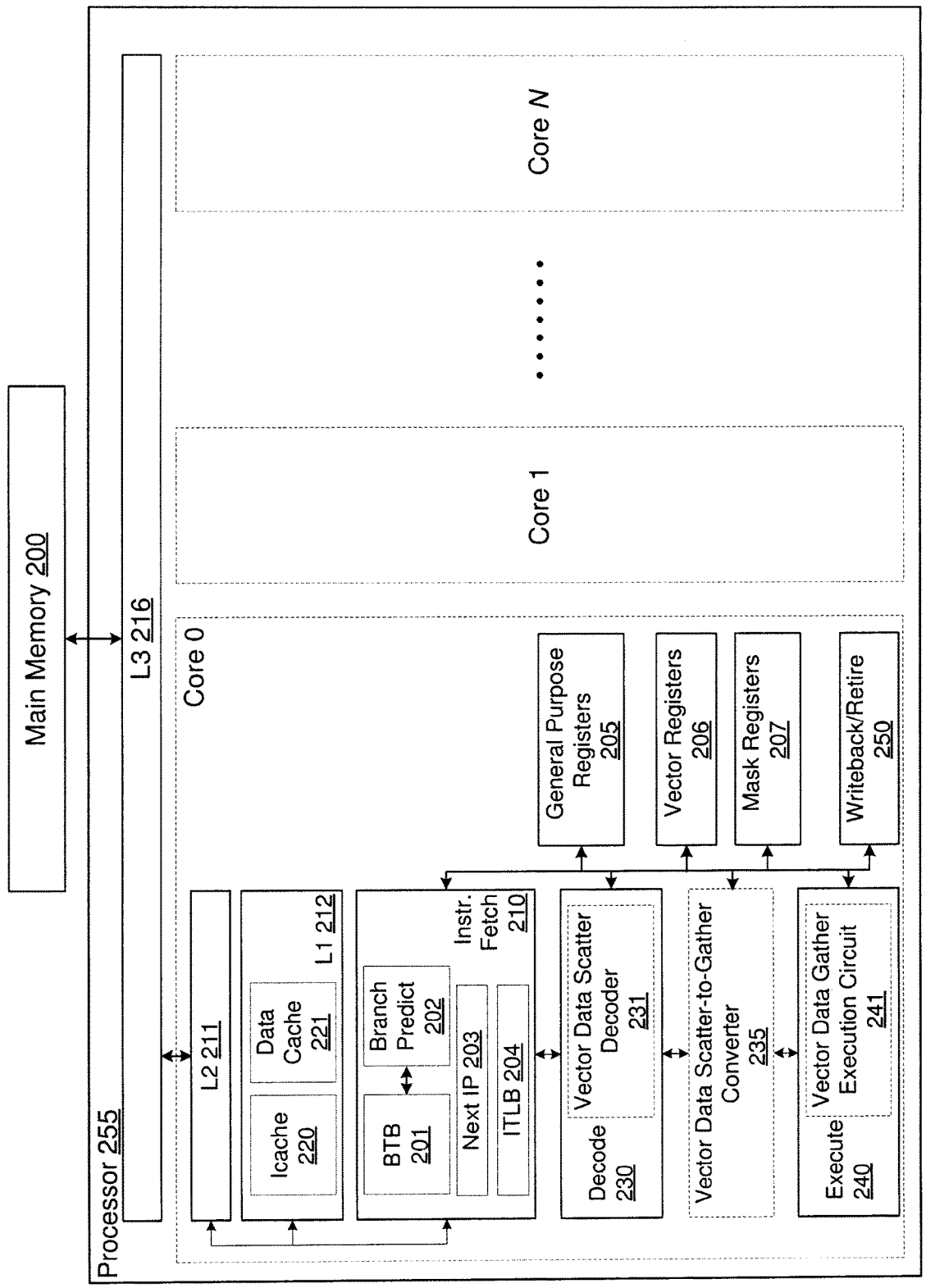
FIG. 2 illustrates an exemplary platform on which embodiments of the invention may be implemented.

FIG. 2 illustrates an exemplary processor 255 on which embodiments of the invention may be implemented. Processor 255 includes a set of general purpose registers (GPRs) 205, a set of vector registers 206, and a set of mask registers 207. In one embodiment, multiple vector data elements are packed into each vector register 206 which may have a 512-bit width for storing two 256-bit values, four 128-bit values, eight 64-bit values, sixteen 32-bit values, etc. However, the underlying principles of the invention are not limited to any particular size/type of vector data.

The details of a single processor core ("Core 0") are illustrated in FIG. 2 for simplicity. It will be understood, however, that each core shown in FIG. 2 may have the same set of logic as Core 0. For example, each core may include a dedicated Level 1 (L1) cache 212 and Level 2 (L2) cache 211 for caching instructions and data according to a specified cache management policy. The L1 cache 212 includes a separate instruction cache 220 for storing instructions and a separate data cache 221 for storing data. The instructions and data stored within the various processor caches are managed at the granularity of cache lines which may be a fixed size (e.g., 64, 128, 512 Bytes in length). Each core of this exemplary embodiment has an instruction fetch unit 210 for fetching instructions from main memory 200 and/or a shared Level 3 (L3) cache 216; a decode unit 230 for decoding the instructions (e.g., decoding program instructions into micro-operatons or "uops"); an execution unit 240 for executing the instructions; and a writeback unit 250 for retiring the instructions and writing back the results.

The instruction fetch unit 210 includes various well known components including a next instruction pointer 203 for storing the address of the next instruction to be fetched from memory 200 (or one of the caches); an instruction translation look-aside buffer (ITLB) 204 for storing a map of recently used virtual-to-physical instruction addresses to improve the speed of address translation; a branch prediction unit 202 for speculatively predicting instruction branch addresses; and branch target buffers (BTBs) 201 for storing branch addresses and target addresses. Once fetched, instructions are then streamed to the remaining stages of the instruction pipeline including the decode unit 230, the execution unit 240, and the writeback unit 250. The structure and function of each of these units is well understood by those of ordinary skill in the art and will not be described here in detail to avoid obscuring the pertinent aspects of the different embodiments of the invention.

In one embodiment, the decode unit 230 includes vector data scatter decode logic 231 for decoding the vector data scatter instructions described herein (e.g., into sequences of micro-operations in one embodiment) and the execution unit 240 includes vector data gather execution logic 241 for executing the instructions.

In some embodiments, the processor 255 additionally includes a vector data scatter-to-gather conversion logic 235 for converting a vector data scatter instruction to a vector data gather instruction to be executed by the execution unit 240. Although the vector data scatter-to-gather conversion logic 235 is shown in FIG. 2 as its own unit, in some embodiments, the vector data scatter-to-gather conversion logic 235 may be included in, or as part of, the decode unit 230 and/or the execution unit 240. For example, the scatter-to-gather conversion logic 235 may include additional decode and execution logic (not shown) implemented respectively in the decode unit 230 and execution unit (240) for decoding and executing various instructions described herein to carry out the necessary scatter-to-gather conversion operations. The various instructions may include horizontal zero count (e.g., VHLZCNT and VHTRZCNT), bit-shift (e.g., VPSLLV), and square compare (VCONF2_SQR) instructions, depending on the type of conversion to be utilized. According to an embodiment, one of the functions of the vector data scatter-to-gather conversion logic 235 is converting a set of scatter control elements associated with an in-register scatter instruction into a set of gather control elements to be used as input to an in-register gather instruction.

Figure 3:
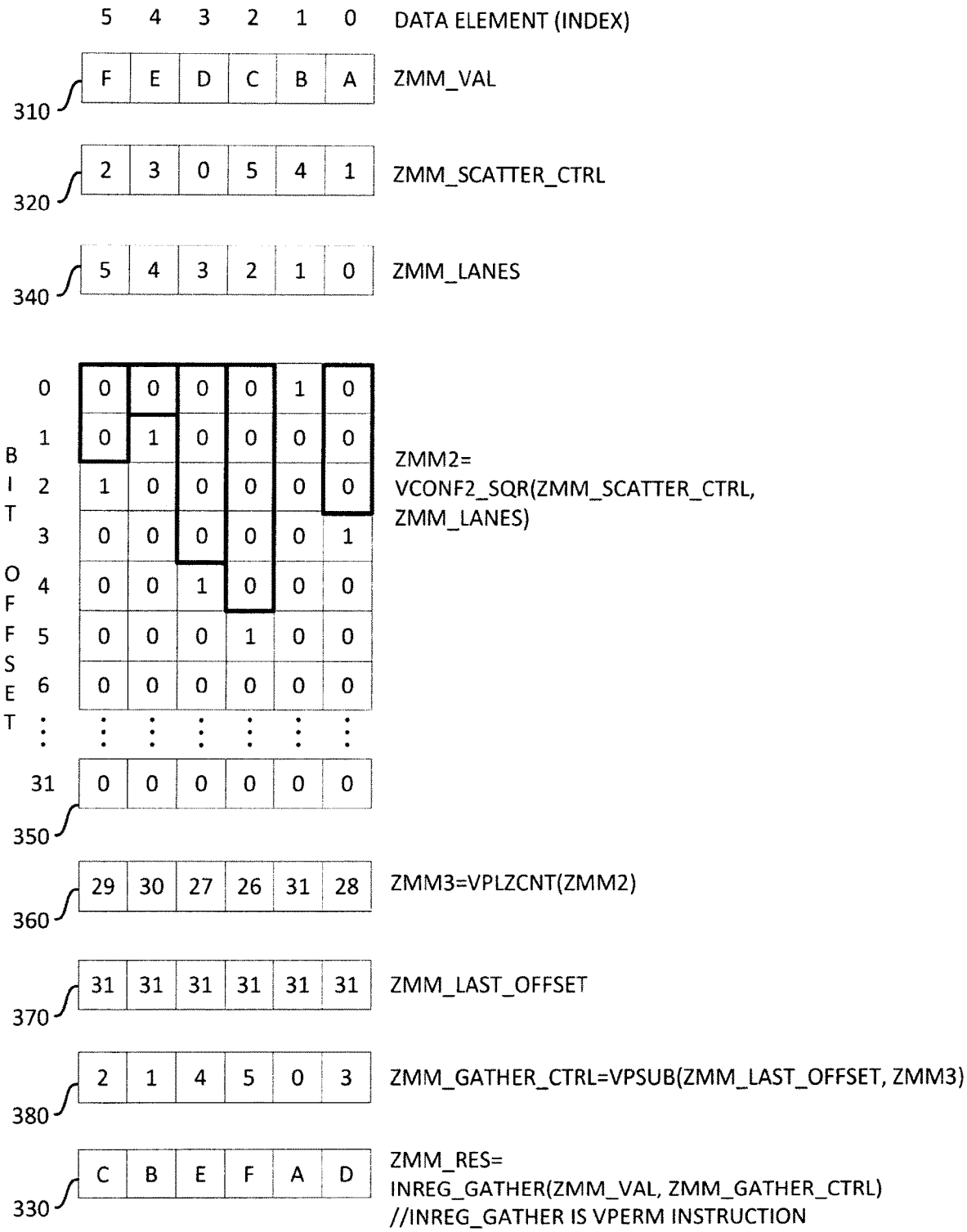
FIG. 3 illustrates an example of emulating the results of executing a scatter instruction by converting it to gather instruction according to an embodiment.

FIG. 3 illustrates an example of emulating the results of executing a scatter instruction by converting it to gather instruction according to an embodiment of the present invention. Just like the example illustrated in FIG. 1, the scatter instruction takes as input a plurality of source vector data elements (e.g., A-F) stored in a source vector register (zmm_val) 310. The position in the destination register 330 to which each of the source vector elements is to be copied to is specified by a corresponding scatter control elements in the scatter control register (zmm_scatter_ctrl) 320. However, in order to perform a gather instruction, the set of scatter control elements in the scatter control register 320 must first be converted to a set of gather control elements. According to an embodiment, the conversion is done by first performing a square comparison (e.g., VCONF2_SQR) between the set of scatter control elements in scatter control register 320 and a vector of data lanes stored in a lanes register (zmm_lanes) 340 to produce a set of indicator bits stored in register (zmm2) 350. In one embodiment, an indicator bit is a bit that is set. Next, the bit offset of each of the indicator bits is determined. To do so, according to an embodiment, the number of leading zeroes with respect to the indicator bits stored in register 350 is calculated for each data element. Note that data lane and data element may be used interchangeably. As illustrated in FIG. 3, register 350 is represented as a KL×N matrix where KL is the number of source vector data elements in the source vector register and N denote the length in bits of the data element (e.g., 32-bits). In FIG. 3, each data element is represented as a vertical column in the matrix and the leading zeros in each data element is marked by a darkened box.

The square comparison compares every packed element in the lanes register 340 to every scatter control element in the control register 320. A corresponding bit position in the matrix is set to 1 if the two compared values are the same. If the two compared values are different then the corresponding bit is set to 0. For example, the first value ("0") in the lanes register 340 is compared to every scatter control element ("1, 4, 5, 0, 3, 2") in the scatter control register 320 to generate a comparison result (i.e., "0, 0, 0, 1, 0, 0"). The comparison result is stored in the first data element of register 350. It is worth noting that since there are only 6 scatter control elements being compared in the illustrated example, only the first 6 bits of each data element will potentially be used for storing an indicator bit. According to an embodiment, any unused bits (e.g., bit offsets 6-31) will simply remain zero if they were initially set to zero, or be set to zero if they were not initialized to zero.

Figure 4:
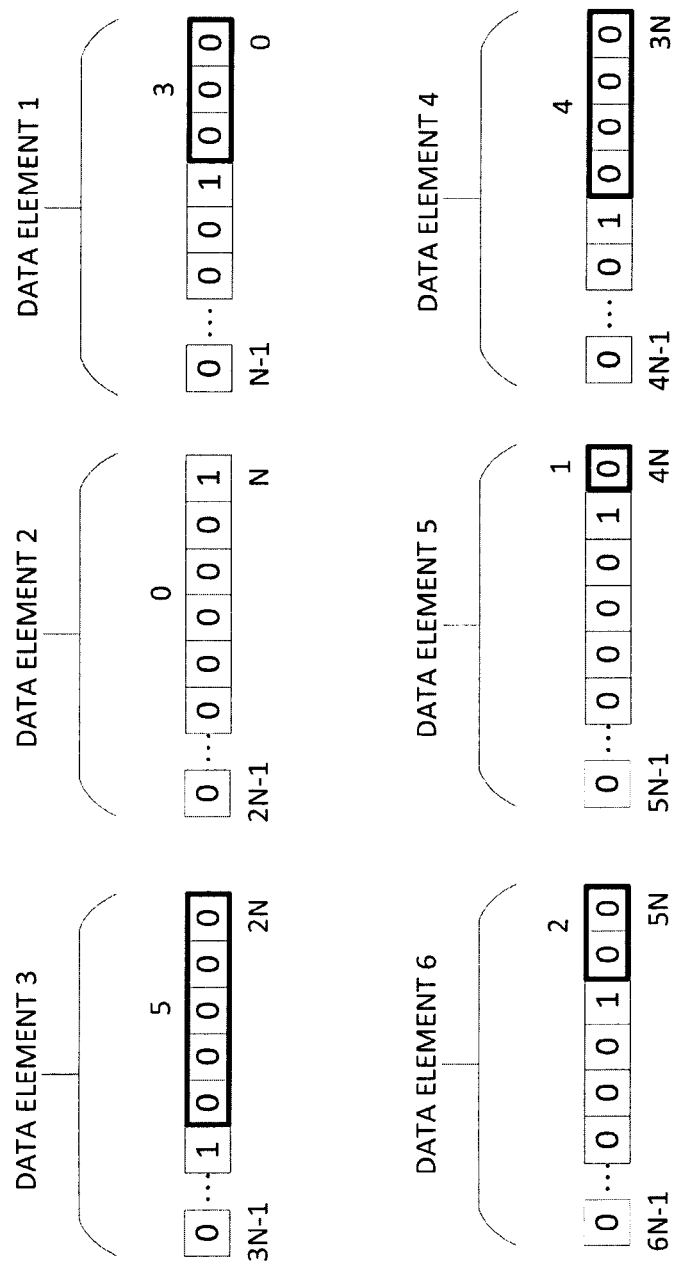
FIG. 4 illustrates an alternative view of performing a leading zero count in a register.

After all the comparisons are completed, the bits that are set to 1 represent the indicator bits. Next, the bit-offset position of the indicator bit in each data element is determined. In one embodiment, this is accomplished by counting the leading zeros in front of the indicator bit for each data element. Another way to do this, according to an embodiment, is to first count in each data element (i.e. column) the number of 0-bits that are stored in bit-offsets that are higher than the indicator bit. This can be accomplished by executing instruction VPLZCNT using register (zmm2) 350 as the operand to generate a plurality of count results, one for each data element. Each generated count result is stored in corresponding data element positions in register zmm3 360. Next, each of the count results is subtracted from the last bit-offset (i.e., N-1) of the respective data element. In one embodiment, the last bit offset of each data element is stored in a vector (e.g., zmm_last_offset). The result of the subtraction (i.e., 380) is the gather control elements to be used in the gather instruction. FIG. 4 provides an alternative view of register 350 in which the data element s are illustrated horizontally instead of vertically. The leading zeroes in each data element are marked by a darkened box.

The comparison of all packed elements in zmm_scatter_ctrl vector to all packed elements in zmm_lanes vector tends to be a bottleneck for many ISAs that do not have enough comparators to perform all the comparisons in parallel. As such, multiple processor cycles are required which results in long latency and low throughput. This brings huge overhead to in-register sorting of vectors and significantly hurts vector performance.

According to another embodiment of the present invention, the comparison between scatter control elements and the vector of data lanes is eliminated and advantageously replaced by a sequence of bit manipulations. By doing so, a sequence of 2 micro-operations ("uops") is used. In the first uop, a shift instruction, such as a VPSLLV instruction, performs a shift on a plurality of packed data elements stored in a vector register. Each of the packed elements has a bit set at the lowest bit offset. The amount of the shift (i.e., shift factor) for each packed data element is defined by a corresponding scatter control element. In the second uop, a horizontal zero count instruction, such as a VHTRZCNT instruction, counts the zero or unset bits for each bit offset position across the packed data elements stored the vector register to generate a plurality of count results. The count results then define the set of gather control elements to be used to execute an in-register gather instruction.

According to an embodiment, the VHTRZCNT instruction is defined as:

```
VHTRZCNT dest, src
    N = VL/KL         //VL - vector length of the whole vector in bits;
                      //KL - number of elements in a vector;
                      //N - size of packed elements in bits;
    for(k=0; k<KL; k++){
        for(i=0; i<KL; i++){
            If(src[i*N+k]==1){
                dest[i+N-1:i] = i;
                break;
            }
        }
    }
```

This VHTRZCNT instruction scans through every data element of the source operand multiple times. According to another embodiment, through the use of a temporary vector, the VHTRZCNT instruction can be further optimized so that every data element is scanned only once:

```
VHTRZCNT dest, src
    N = VL/KL         //VL - vector length of the whole vector in bits;
                      //KL - number of elements in a vector;
                      //N - size of packed elements in bits;
    tmp[KL-1:0]=0;    //accumulator
    for(i=KL-1; i>=0; i--){
        for(k=0; k<KL; k++){
            if(src[i*N+k]==0){
                tmp[k]++;
            }else{
                tmp[k]=0;
            }
        }
    }
    dest[KL-1:0]=tmp[KL-1:0]
```

Figure 5A:
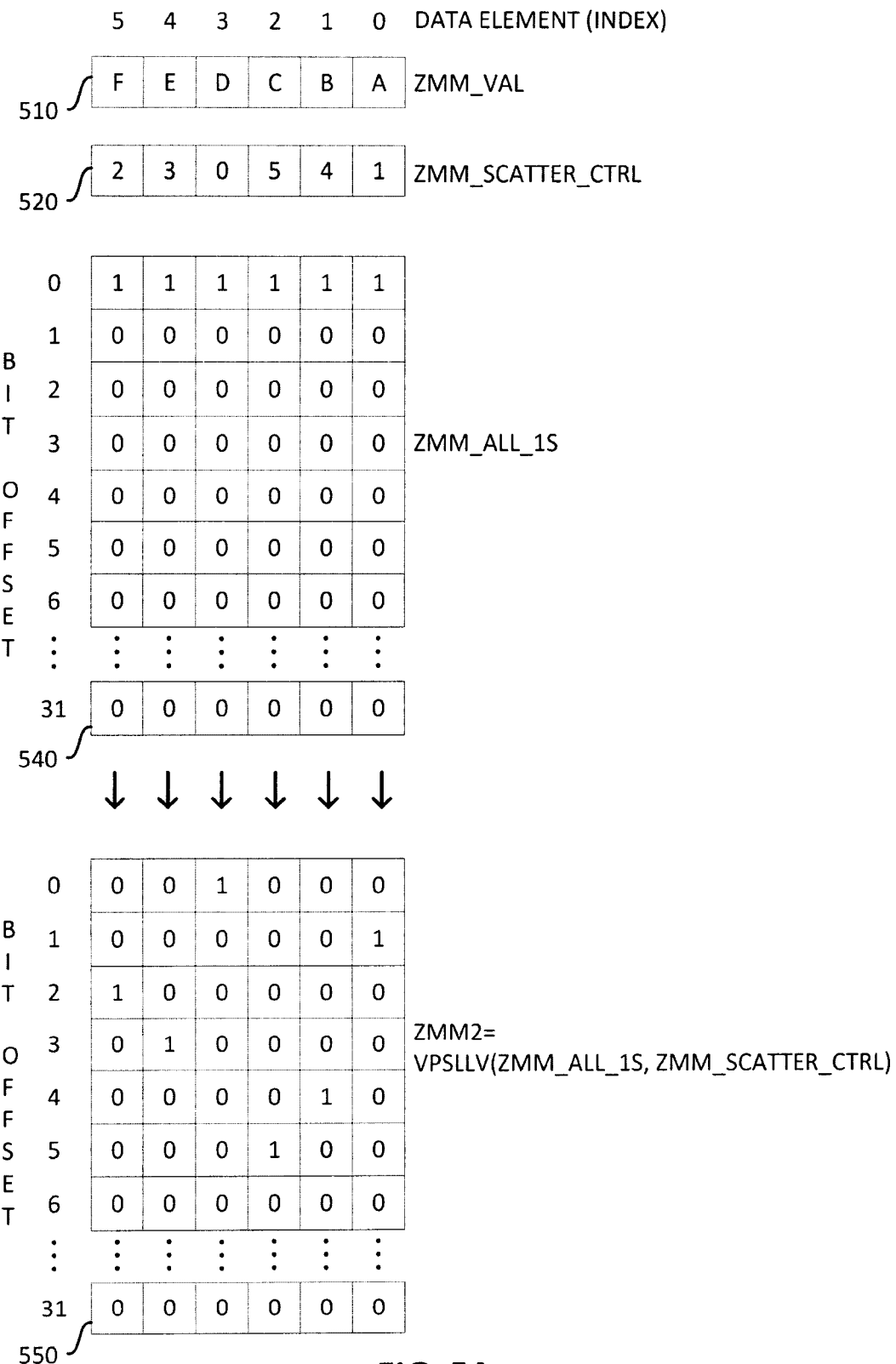
FIG. 5A-5B illustrates the conversion of a set of scatter control elements into a set of gather control elements for a gather instruction by performing a sequence of bit manipulations in accordance to an embodiment of the present invention.
Figure 5B:
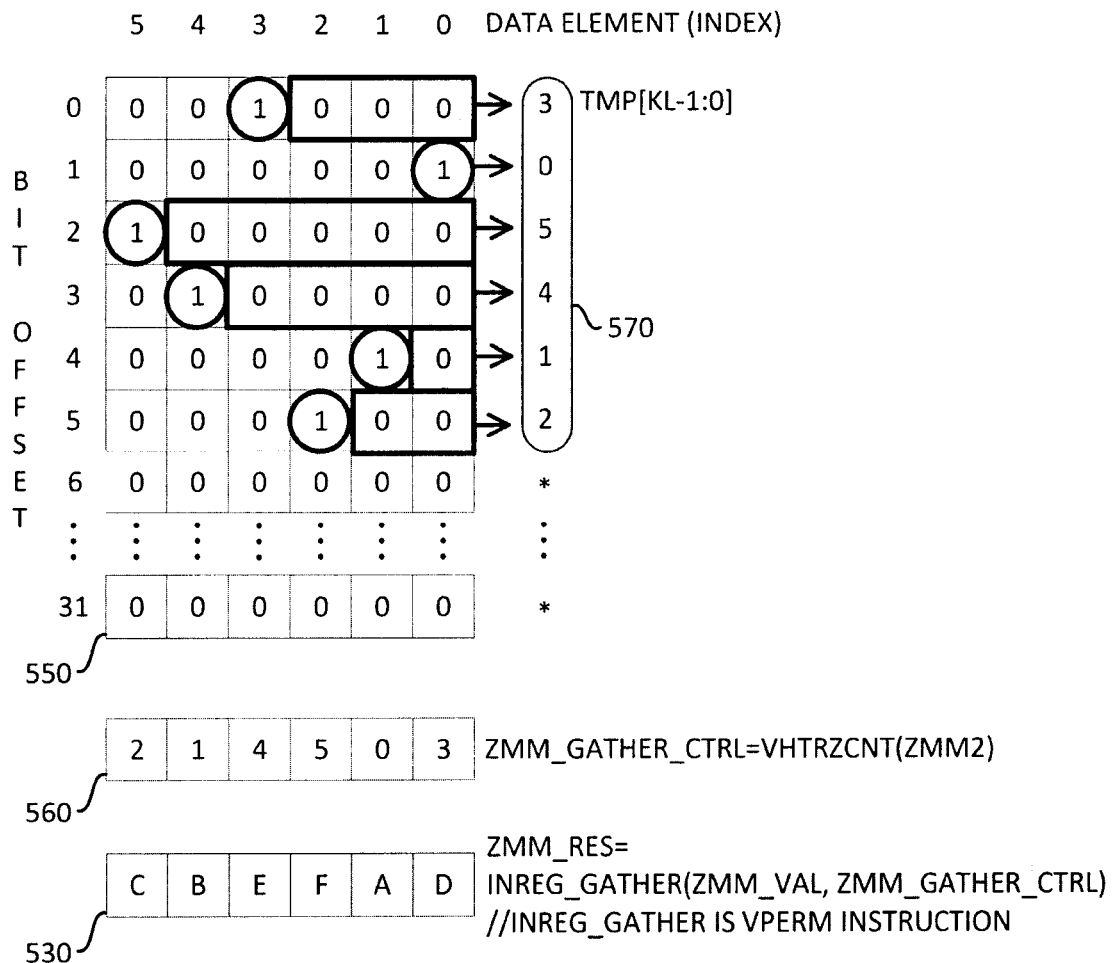

FIG. 5A-B illustrate an embodiment of the present invention for converting a set of scatter control elements into a set of gather control elements for a gather instruction by performing a sequence of bit manipulations. As illustrated in FIG. 5A, a source vector register (zmm_val) 510 stores a plurality of source vector data elements (e.g., A-F). A scatter control register (zmm_scatter_ctrl) 520 stores a set of scatter control element. An all-ones register (zmm_all_1s) 540 stores a plurality of packed elements which all have value "1" stored in their respective first bit position (e.g., bit-offset 0). According to an embodiment, the first bit position in a packed element is the least significant bit position within the packed element. In the first uop, a shift instruction, such as a VPSLLV instruction, performs a shift on each of the packed elements stored in all-ones register 540. The amount of the shift (i.e., shift factor) for each packed element is defined by a corresponding element in the scatter control vector 520. The shifted packed elements are stored in an intermediate vector register (zmm2) 550. A horizontal representation of the all-ones register 540 is illustrated in FIGS. 6A-B. Every lane (i.e., lanes 1-6) represents a packed element. In FIG. 6A, every packed element has the value "1" stored in its respective first bit position. In FIG. 3, the value "1" stored in the first bit position of each packed element is bit-shifted from the first bit position by a number of bit positions indicated by a corresponding element in the scatter control vector 520. In an embodiment, the direction of the bit-shift is from the lowest significant bit to the highest. The 1-bit may also be referred to as the indicator bit.

Referring to FIG. 5B, in the second uop, a horizontal zero count instruction, such as VHTRZCNT, is executed which initiates a scan across all packed elements in vector register zmm2 550 at each bit offset. For each bit offset, a packed element that has a 1-bit set at that bit offset is found. In one embodiment, the index of this found packed element is stored into a results register (zmm_gather_ctrl) 560 in a data element corresponding the bit offset. For instance, in vector register zmm2 550, data element 3 has a "1" set at bit offset 0 while data elements 0, 1, 2, 4, and 5 have a "0" set at their respective bit offset 0. The index (i.e., 3) of the found data element is stored in the results register 560 at the data element corresponding to bit offset 0 (i.e., data element 0). According to an embodiment, the index of the found element is determined by counting the number of 0 bits that are set at the same bit offset between the found element and the lowest-indexed data element. In one embodiment, the lowest-indexed data element is also the one with the least significant bit. For instance, relative to the "1" found at bit offset 0 of data element 3, there are three lower-indexed data elements (i.e., data elements 2, 1, and 0, with data element 0 being the lowest indexed data element) that have a "0" set at the same bit offset (i.e., bit offset 0). As such, a "3" is stored into the results register (zmm_gather_ctrl) 560 at data element 0. This is performed for every bit offset. According to an embodiment, if the found element is also the lowest-indexed data element, the number of 0 bits that are set at the same bit offset between the found element and the lowest-indexed data element is 0. For example in FIG. 5B, data element 0 of vector register zmm2 550 is the data element that has a 1-bit set at bit offset 1. Data element 0 also happens to be the lowest-indexed data element. As such, a "0" is stored in the result register (zmm_gather_ctrl) 560 at data element 1, which corresponds to offset 1. After all bit offsets have been scanned, the vector in the results register (zmm_gather_ctrl) 560 is then used to define or generate the gather control elements to be used in the execution of the in-register gather instruction, such as a VPERM instruction, in the final permutation stage of sorting sequence according to an embodiment.

Figure 7A:
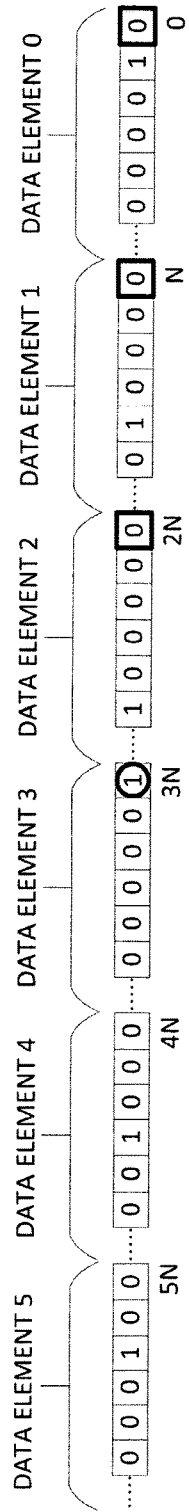
FIG. 7A-7F illustrates an exemplary horizontal trailing zero count instruction in accordance to an embodiment.
Figure 7B:
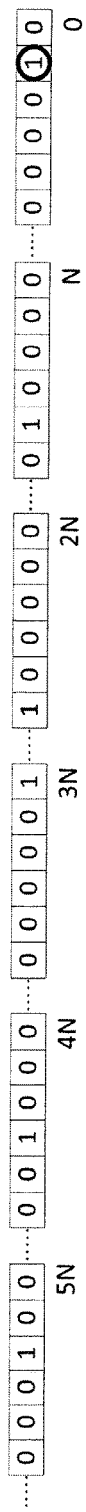
Figure 7C:
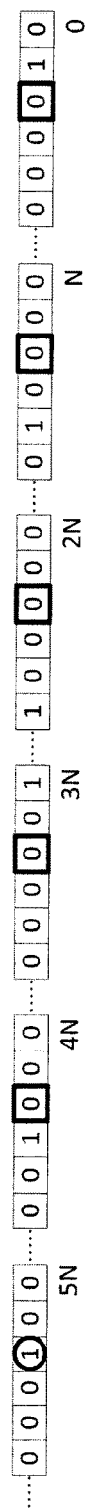
Figure 7D:
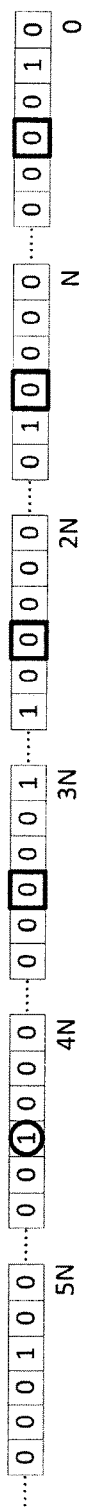
Figure 7E:
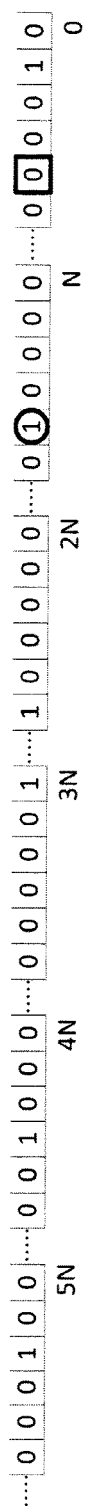
Figure 7F:
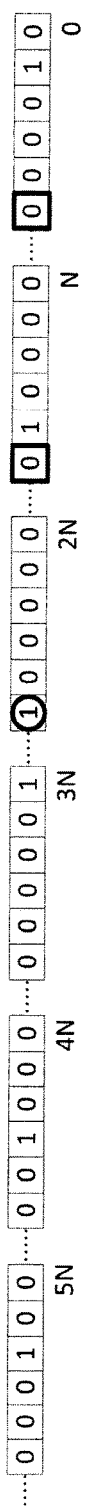

FIGS. 7A-F illustrate a horizontal representation of the vector register zmm2 550 and the scanning of all packed elements at each bit offset within the vector register zmm2 according to an embodiment. FIG. 7A illustrate the scanning of the first bit offset in each packed element starting from right to left, such that the order of the bit positions scanned in one pass is bits 0, N, 2N, 3N, 4N, 5N, where N is the number of bits in each packed element. In FIG. 7B, the second bit offset in each packed element is scanned (i.e., bits 1, N+1, 2N+1, 3N+1, 4N+1, 5N+1). In FIG. 7C, the third bit offset position is scanned. And so on. The first "1" found at each offset is marked by a darkened circle and any "0" found at the same offset in each of the lower indexed data element is marked with a darkened box.

FIGS. 8A-F illustrate the use of a temporary vector to track and/or determine the data element in which a bit is set at a particular bit offset. In contrast with the example illustrated in FIGS. 7A-F, when a temporary vector (TMP) is used, each data element only needs to be scanned once. According to an embodiment, each data element of the temporary vector is used as a counter for keeping track of the number of 0-bits that are set at a particular bit offset. According to another embodiment, each data element of the temporary vector corresponds to one of bit offset. However, in the example illustrated by FIGS. 8A-F, only the first 6 bits of each data element can potentially have an indicator bit (i.e., 1-bit). This means the temporary vector only needs to have enough counters to track the first 6 bit offsets. As such, according to an embodiment, the number of data elements in the temporary vector is equal to the number of data elements in vector register zmm2 550 (i.e., KL).

Initially, every data element in the temporary vector is set to zero. Next, each data element of the vector register (zmm2) 550, starting from the highest to the lowest, is scanned bit by bit and the corresponding data element in the temporary vector is responsively updated based on the scanned bit value. The bits in each data element of the vector register (zmm2) 550 may be scanned in either direction. If the scanned bit value is zero, the corresponding data element in the temporary vector is incremented by one. If the scanned bit value is zero, the corresponding data element in the temporary vector is set to zero. In FIG. 8A, every bit of data element 5 is scanned. The bits at bit offsets 0, 1, and 3-5 are zero and thus their corresponding data element in the temporary vector is incremented by 1. On the other hand, the bit at bit offset 2 is one and thus a corresponding data element in the temporary vector is set to 0. It is worth noting that bit offsets 0, 1, 2, 3, 4, 5 in data element 5 corresponds to bits 5N, 5N+1, 5N+2, 5N+3, 5N+4, and 5N+5 of vector register zmm2 550.

In FIG. 8B, every bit of data element 4 is scanned. The bits at bit offsets 0-2 and 4-5 are zero and their corresponding data element in the temporary vector are each incremented by 1. In contrast, the data element in the temporary vector that corresponds to bit offset 3 is set to 0 because the bit at bit offset 3 in data element 4 is 1. FIGS. 8C-8F illustrate the scanning of data elements 0-3, respectively. After all the data elements are scanned, the resulting temporary vector 810 is then used to generate or define the set of gather control elements to be used in the execution of the in-register gather instruction, such as a VPERM instruction, in the final permutation stage of sorting sequence.

Figure 9:
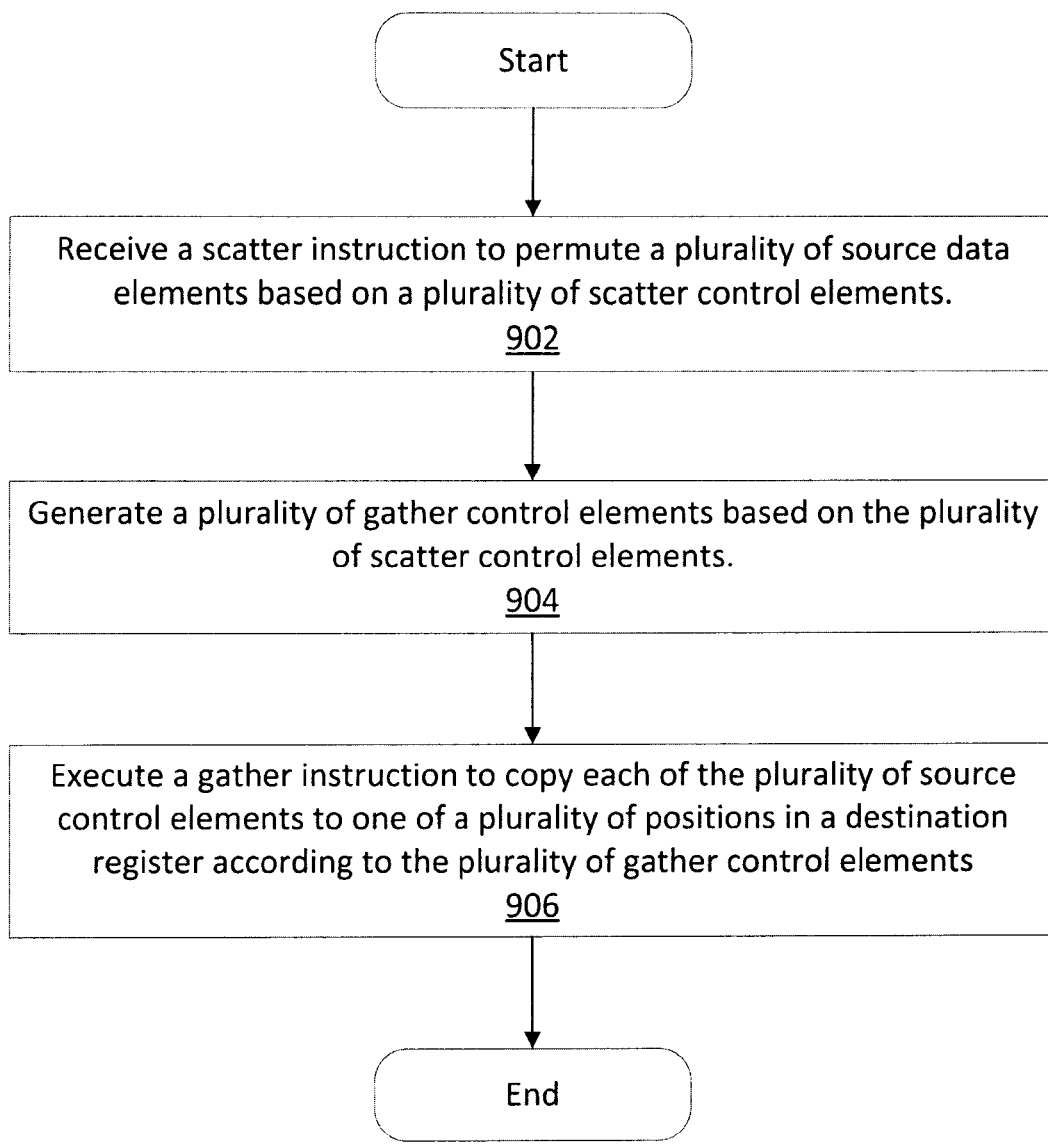
FIG. 9 is a flow chart illustrating the operations and logic for executing a scatter instruction as a gather instruction according to an embodiment.

FIG. 9 is a flow chart illustrating the operations and logic for executing a scatter instruction as a gather instruction according to an embodiment of a method. The method may be implemented within the context of the system architectures described above, but is not limited to any specific system architecture. At block 902, a processing unit, such as a processor, receives a scatter instruction to permute a plurality of source data elements based on a plurality of scatter control elements. According to an embodiment, the scatter instruction identifies or includes as operands the plurality of source data elements and a set of scatter control elements corresponding to the source data elements. The scatter instruction is to be decoded by a decode logic of the processing unit in accordance to an embodiment. At block 904, a plurality of gather control elements is generated based on the plurality of scatter control elements identified and/or included in the scatter instruction. According to an embodiment, the generation gather control elements from scatter control elements is performed by a vector data scatter-to-gather conversion logic of the processing unit. At block 906, a gather instruction is executed to copy each of the plurality of source control elements to one of a plurality of positions in a destination register according to the plurality of gather control elements. In one embodiment, the gather instruction is executed by an execution logic of the processing unit.

Figure 10:
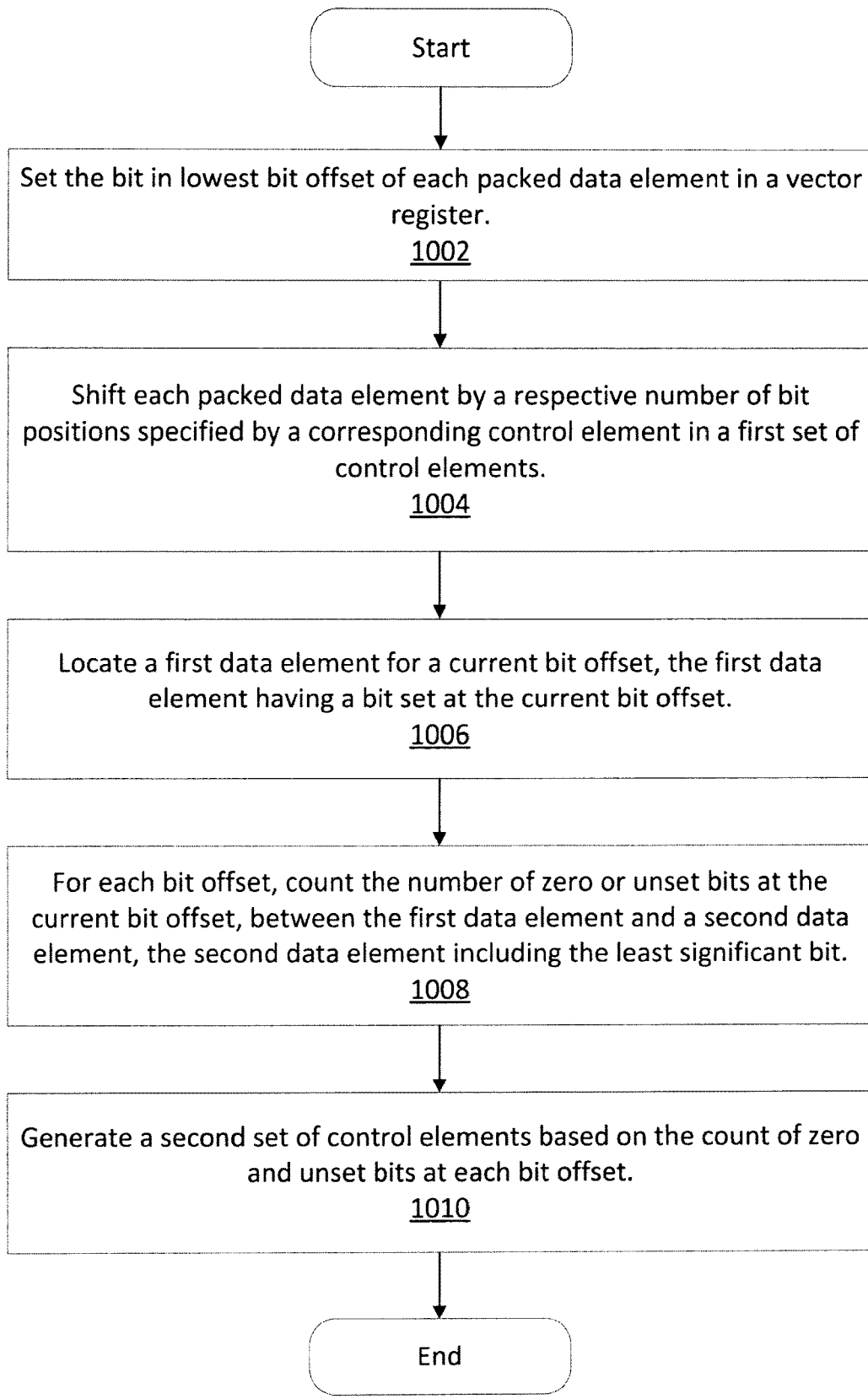
FIG. 10 is a flow chart illustrating an embodiment of the operations and logic for converting scatter control elements to gather control elements.

FIG. 10 is a flow chart illustrating an embodiment of the operations and logic for converting scatter control elements to gather control elements. According to an embodiment, the conversion is performed by a vector data scatter-to-gather conversion logic. At block 1002, the bit with the lowest bit offset in each data element of a vector register is set (e.g., set to 1) while bits in all other bit offsets are unset (e.g. set to 0). At block 1004, each data element in the vector register is shifted by a respective number of bit positions specified by a corresponding control element in a first set of control elements. According to an embodiment, the first set of control elements comprises scatter control elements to be used in the execution of an in-register scatter instruction. At block 1006, a starting data element in the vector register is located for each bit offset. According to an embodiment, the starting data element for a bit offset is the data element that has a bit set at that bit offset. At block 1008, the number of zero-bits or unset bits between the starting data element and an ending data element at a particular bit offset is counted. In one embodiment, the ending data element is the data element that has the least significant bit. At block 1010, the count results collected from each bit offset are then used to define or generate a second set of control elements. The second set of control elements, according to an embodiment, comprises gather control elements to be used in the execution of an in-register gather instruction.

While the VHTRZCNT instruction described above works well in the scenarios where the value of each scatter control element is unique, as is generally the case for in-register sorting, it cannot be used in a more general case where the scatter control elements may contain duplicate values. As noted above, each scatter control element defines a position in the destination vector register to which a corresponding source data element will be stored. Thus, when duplicate scatter control elements are present, it means 2 or more source data elements are stored to the same position in destination register. To be consistent with the semantics of scatter behavior, the source data element in the highest index position should be stored to the destination register instead of the source data element in a lower index position. For example, in FIG. 11, there are two sets of duplicate scatter control elements stored in the scatter control element register zmm_scatter_ctrl 1120. The scatter control elements at index positions 1 and 3 are both the value "0". The scatter control elements at index positions 2 and 4 are both the value "3". This means that the source data elements at index positions 1 and 3 of source register zmm_val 1110 (i.e., "B" and "D") are to be stored into index "0" of destination register 1130. This is done sequentially where "B" is first written into index "0" and followed by "D" being written into the same index position. The end result is that "D" overwrites the previous stored "B", leaving "D" at index "0" in the destination register. The same things applies to source data elements at index positions 2 and 4 of the source register zmm_val 1110 (i.e., "C" and "E"). In similar fashion, "C" is first stored into index position 3 of the destination register 1130 and then overwritten by the subsequent storing of "E" into the same index position. However, in the case of using the VHTRZCNT instruction described above, the first coming value will be written to the destination register instead of the value that comes later. As such, a different instruction sequence is needed to correctly convert scatter control elements into gather control elements when the scatter control elements contain duplicate values.

As noted above, one solution for converting scatter control elements into gather control elements is based on a square 2-source conflict compare instruction such as VCONF2_SQR. One embedment of a totally in-register scatter emulation instruction sequence based on VCONF2_SQR consists of 5 instructions:

1) zmm2=VCONF2_SQR(zmm_scatter, zmm_lanes)
2) zmm3=VPLZCNT(zmm2)
3) kl=VPTESTM(zmm2)
4) zmm_gather_ctrl=VPSUB(zmm_last_offset, zmm3)
5) zmm_res{kl}=VPERM(zmm_val, zmm_gather_ctrl)

Figure 12:
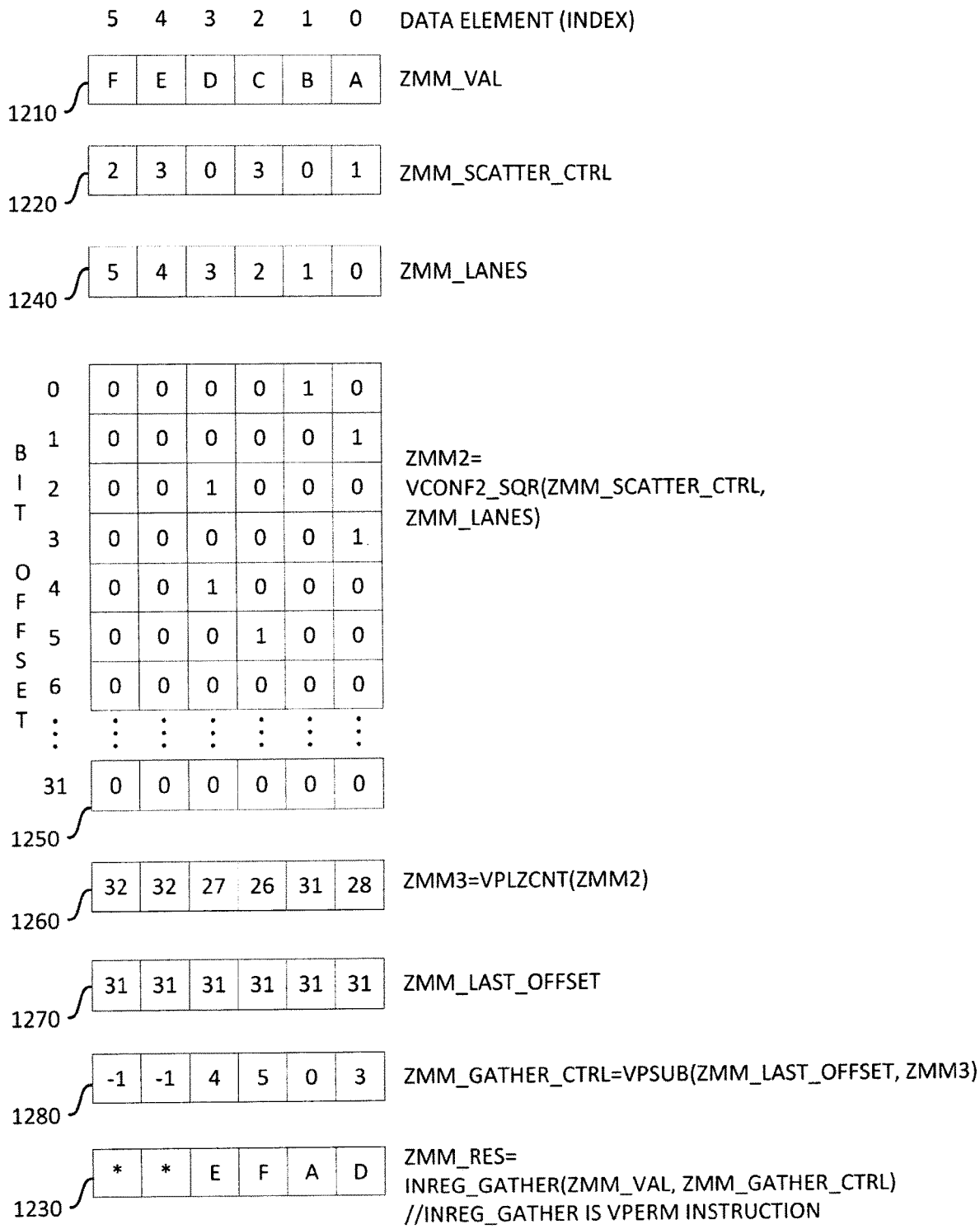
FIG. 12 illustrates an example of emulating the results of executing a scatter instruction by converting it to gather instruction according to an embodiment.

FIG. 12 illustrate an in-register scatter emulation instruction sequence based on VCONF2_SQR, according to an embodiment, when there are duplicate values in the scatter control elements. In FIG. 12, the source vector register (zmm_val) 1210 contains 6 (i.e., KL=6) source vector data elements (i.e., A-F) to be sorted or permuted. Each of the source vector data elements is 32-bit wide (i.e., N=32). The output of VCONF2_SQR is shown as a 2-dimensional matrix. The position in the destination register 1230 to which each of the source vector elements is to be copied to is specified by the scatter control elements in the scatter control register (zmm_scatter_ctrl) 1220. According to the embodiment, a square comparison (e.g., VCONF2_SQR) is first performed between the set of scatter control elements in scatter control register 1220 and a vector of data lanes stored in a lanes register (zmm_lanes) 1240 to produce a set of indicator bits stored in register (zmm2) 1250. In one embodiment, an indicator bit is a bit that is set. As noted before, data lanes and data elements may be used interchangeably. Next, the bit offset of each of the indicator bits that appears in a data element is determined for each data element. However, since there are duplicates in the scatter control elements, some data elements may have two or more indicator bits, such as data elements 0 and 3 shown in FIG. 12. To resolve this issue, according to an embodiment, the indicator bit with the highest bit offset in a data element is used for that data element.

Returning to FIG. 12, square comparison instructions such as VCONF2_SQR compares every packed element in the lanes register 1240 to every scatter control element in the control register 1220. A corresponding bit position in the matrix is set to 1 if the two compared values are the same and set to 0 if they are different. For example, the first value ("0") in the lanes register 1240 is compared to every scatter control element ("1, 0, 3, 0, 3, 2") in the scatter control register 1220 to generate a comparison result (i.e., "0, 1, 0, 1, 0, 0"). This comparison result is stored in the first data element of register 1250. Since there are only 6 scatter control elements are being compared in the illustrated example, only the first 6 bits of each data element will potentially be used for storing the indicator bits. According to an embodiment, any unused bits (e.g., bit offset 6-31) will simply remain zero if they were initially set to zero, or be set to zero if they were not initialized to zero.

After all the comparisons are completed, the bits that are set to 1 represent the indicator bits. Next, the bit-offset position of the indicator bit in each data element is determined. As noted above, situations where more than one indicator bits are in a single data element are resolved by using the indicator bit with the highest index position for that data element. According to an embodiment, instruction VPLZCNT is executed on register zmm2 to count the number of 0-bits that are stored at bit offsets higher than the indicator bit in each data element. The count results from executing the VPLZCNT instruction are stored in in register zmm3 360. Then, the count result of each data element is subtracted from the last bit offset (i.e., N−1) in that data element. The last index position of each data element is stored in a vector (e.g., zmm_last_offset) 1270 according to an embodiment. The results of the subtraction 1280 defines the gather control elements for use in a gather instruction. According to an embodiment, when there are duplicate scatter control elements, some of the data elements will have no indicator bits. As such, the result of the subtraction may include negative values (e.g., −1). The negative values represent data elements that are not used and ignored by the gather instruction according to an embodiment.

Figure 13:
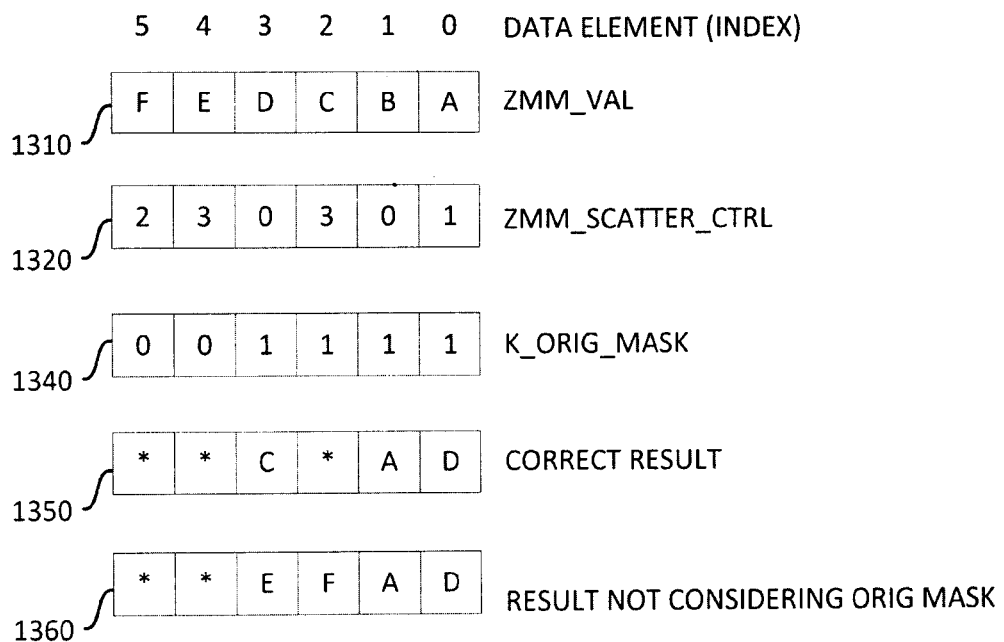
FIG. 13 illustrates an example of sorting and/or permuting a plurality of packed vector data elements using a scatter instruction that includes duplicate scatter control elements and a mask.

One disadvantage of this approach is the huge cost of VCONF2_SQR which requires a large number of comparators, something that may or may not be present in current and future hardware. Additionally, there is the issue of masking. When scatter is done under a mask, such as in situations where a related computation is under an IF condition or when the computation is in a remainder loop, only the unmasked values should be permuted and stored. FIG. 13 illustrate the complexity involved when a scatter instruction includes a mask. As illustrated in FIG. 13, register (zmm_val) 1310 contains the source vector data elements to be scattered, register zmm_scatter_ctrl 1320 contains the scatter control elements, and register k_orig_mask 1340 contains the mask that includes a plurality of masking bits, each of which corresponds to a data element. When applied, the masking bits define which source vector data elements are to be scattered into the destination register by the scatter instruction and which are not. According to an embodiment, only the source data elements having its corresponding mask bit set to 1 are to be scattered. Source data elements with corresponding mask bit set to 0 are to be "masked" or ignored, thus not copied to the destination register. In FIG. 13, only the first four source data elements (i.e., data elements 0-3) have their corresponding mask bit set to 1. As such, source data elements A, B, C, and D are the only ones to be scattered into the destination register by the scatter instruction. The results of the scatter instruction, executed with and without a mask, are shown in registers 1350 and 1360 respectively. It is obvious that the results generated with and without mask are not the same. Two observations can be made from this example:

1) Original mask cannot simply be used as a write-mask for writing the final result. As illustrated in the example shown in FIG. 13, the original mask (001111) is different from the write mask needed to write the correct result (1350) into the destination register (i.e., 001011). This means the final write-mask needs to be generated which will incur an overhead.

2) Original mask must be taken into consideration when converting scatter control elements to gather control elements, as different original masks will generate different gather control elements, even though the scatter control elements may be the same.

Based on these two observations, the handling of masked in-register scatter in the general case will require additional overhead. One possible solution is shown in the instruction sequence below, which incorporates VPBRODCASTM and VPAND instructions to the VCONF2_SQR based in-register scatter emulation instruction sequence described above:

1) zmm2=VCONF2_SQR(zmm_scatter, zmm_lanes)
2) zmm3=VPBRODCASTM(k_orig_mask)
3) zmm4=VPAND(zmm2, zmm3)
4) zmm5=VPLZCNT(zmm4)
5) kl=VPTESTM(zmm5)
6) zmm_gather_ctrl=VPSUB(zmm_last_offset, zmm5)
7) zmm_res{kl}=VPERM(zmm_val, zmm_gather_ctrl)

In the above instruction sequence, the combination of executing the VPBROADCASTM and VPAND instructions effectively eliminates the 1-bits (i.e., indicator bits) that are masked-out by the original mask from the result of the square comparison. As such, the masked out indicator bits will not participate in the generation of gather control elements and final write-mask.

While the above VCONF2_SQR-based instruction sequence, which includes VBRODCAS™ and VPAND instructions, is capable of generating the correct gather control elements from a set masked scatter control elements, the use of the VCONF_SQR instruction tend to lead to significant degradation in the performance of vector operations because of the large number of comparisons that needs to be made. As such, aspects of the present invention are directed to the conversion of scatter control elements that are to be used in the most general case of in-register scatter instruction that includes duplicate values and mask bits, into gather control elements to be used in an in-register gather instruction, by performing only bit manipulations.

According to an embodiment, the instruction sequence to emulate the execution of an in-register scatter instruction as an in-register gather instruction through bit manipulations consists of 5 instructions. An example of the instruction sequence is as follows:

1) zmm2{k_orig_mask} {z}=VPSLLV(zmm_all_1s, zmm_scatter_ctrl)
2) zmm3=VHLZCNT(zmm2)
3) zmm_gather_ctrl=VPSUB(zmm_all_-1s, zmm3)
4) kl=VPCOMPNEQ(zmm_all_-1s, zmm_gather_ctrl)
5) zmm_res{kl}=VPERM(zmm_val, zmm_gather_ctrl)

According to the embodiment, the instruction sequence described herein is carried out in 5 micro-ops ("uops"). In the first uop, a shift instruction, such as a VPSLLV instruction, performs a shift on a plurality of packed data elements stored in a vector register (i.e., zmm_all_1s). Each of the packed elements has a bit set at the lowest bit offset. The amount of the shift (i.e., shift factor) for each packed data element is defined by a corresponding scatter control element stored in a scatter control register (i.e., zmm_scatter_ctrl). In one embodiment, the result of the shift is stored in a first intermediate vector (i.e., zmm2). For masked scatter instructions, according to an embodiment, the mask can be applied in the first uop on the packed data elements stored in the vector register zmm_all_1s. In the second uop, a horizontal zero count instruction, such as a VHLZCNT instruction, counts the zero or unset bits for each bit offset across the shifted packed data elements to generate a plurality of count results. According to an embodiment, the count results are stored in a second intermediate vector (i.e., zmm3). In the third uop, a vector subtraction instruction, such as VPSUB, subtracts each of the count results from value KL-1. In one embodiment, the value KL is the number of scatter control elements, which is also equal to the number of source data elements to be scattered, since each source data element corresponds to a scatter control element. The results from the vector subtraction are then used to generate or define a set of gather control element for use in an in-register gather instruction, such as a VPERM instruction. In the fourth uop, a write mask is computed by comparing the results from the vector subtraction to a constant vector consisting of all "-1" values. According to an embodiment, the comparison is performed by execution a VPCOMPNEQ instruction. In the fifth uop, the generated set of gather control elements and the write mask are used in the execution of an in-register gather instruction, such as VPERM, to permute or sort a plurality of source data elements stored in source register (i.e., zmm_val).

An embodiment of the VHLZCNT instruction is defined as:

---

VHLZCNT{D,Q} dest, src
N = VL/KL    //VL - vector length of the whole vector in bits
             //KL - number of elements in a vector;

```
                    //N - size of packed elements in bits;
for(k=0; k<KL; k++){
    for(tmp=0, i=0; i<KL; i++){
        If(src[i*N+k]==0){
            tmp++;
        else
            tmp=0
        }
    }
    dest[k+N-1:k]=tmp;
}
```

This VHLZCNT instruction scans through every data element of the source operand (i.e., src) multiple times. According to another embodiment, through the use of a temporary vector, the VHLZCNT instruction can be further optimized so that every data element is scanned only once:

```
VHLZCNT {D,Q} dest, src
N = VL/KL           //VL - vector length of the whole vector in bits;
                    //KL - number of elements in a vector;
                    //N - size of packed elements in bits;
tmp[KL-1:0]=0;      //accumulator
for(i=0; i<KL; i++){
    for(k=0; k<KL; k++){
        if(src[i*N+k]==0){
            tmp[k]++;
        }else{
            tmp[k]=0;
        }
    }
}
dest[KL-1:0]=tmp[KL-1:0]
```

Here, data elements in the source operand (i.e., src) are scanned one by one and number of zeroes is accumulated for each bit offset "k" inside the data elements. When a "0" is met on the way, the accumulator (i.e., tmp[k]) is incremented. On the other hand, when a "1" is met the accumulator (i.e., tmp[k]) is zeroed. The final result will contain the number of zeroes leading the very last "1" at each bit offset "k" across all the data elements. For the bit offsets that do not contain a "1" bit, the number of zeros accumulated will be KL.

Figure 14A:
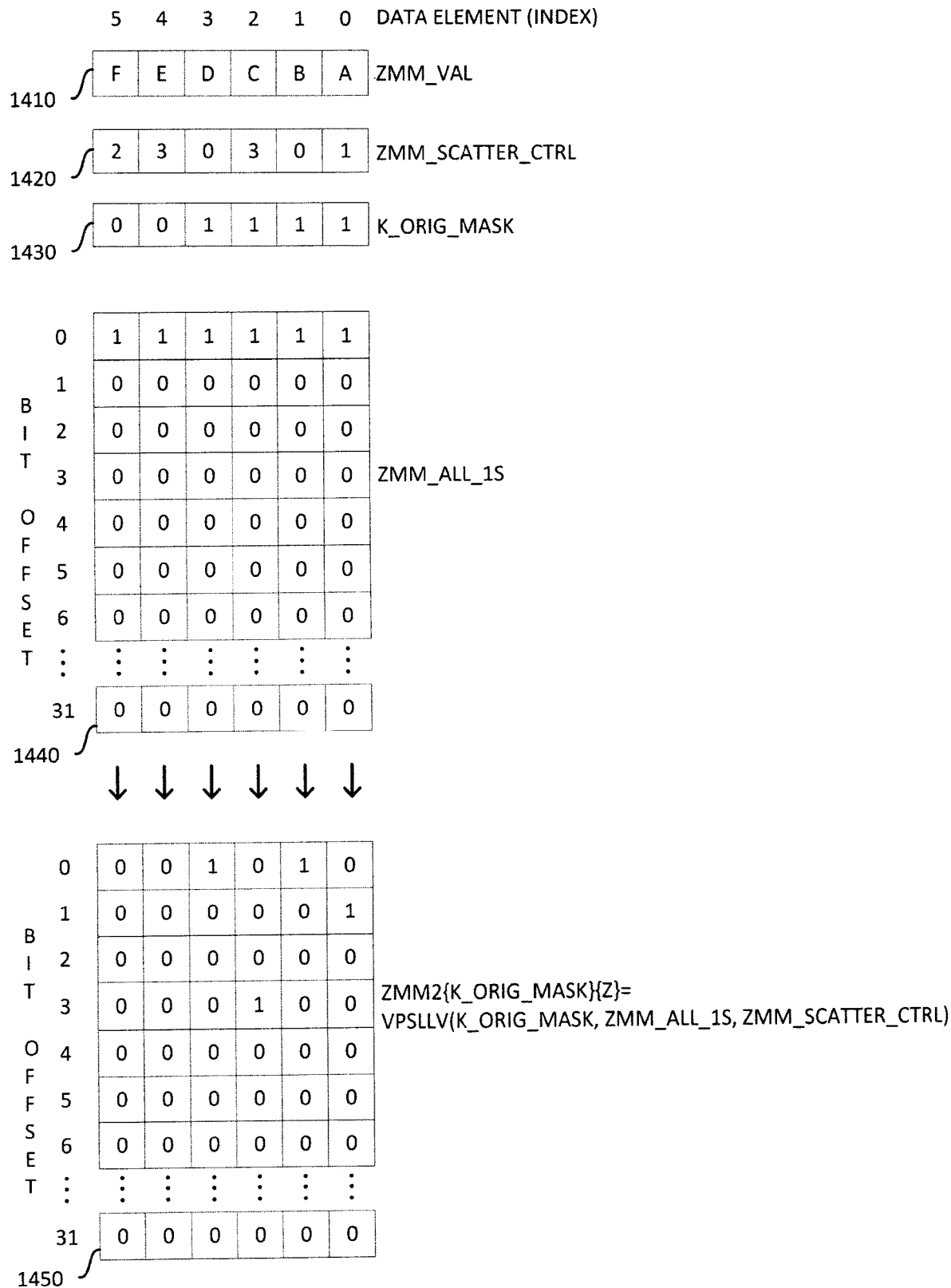
FIG. 14A-14B illustrates the conversion of a set of scatter control elements into a set of gather control elements for a gather instruction by performing a sequence of bit manipulations in accordance to an embodiment of the present invention.
Figure 14B:
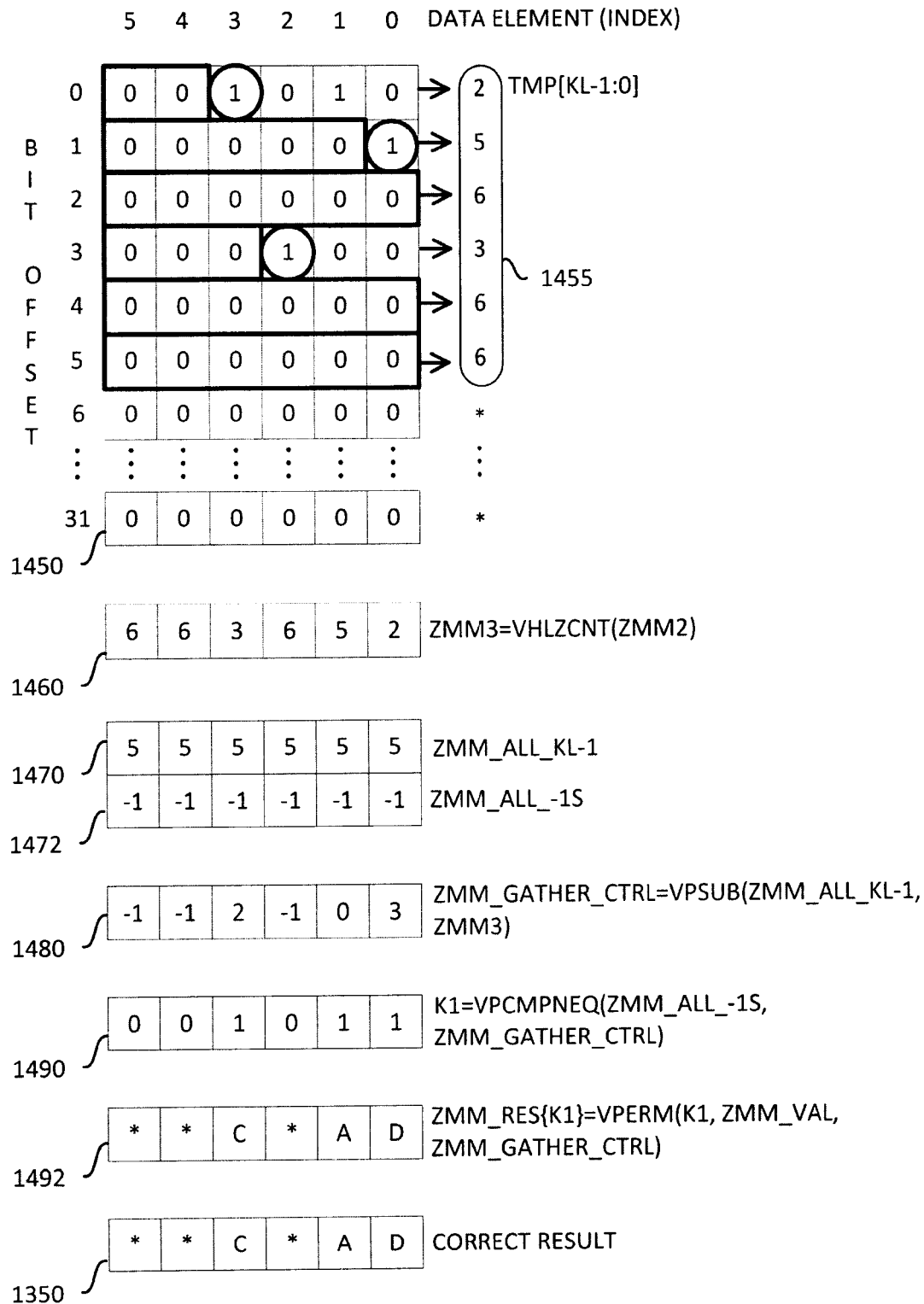

FIG. 14A-B illustrate an embodiment of the present invention for converting a set of scatter control elements into a set of gather control elements for a gather instruction by performing a sequence of bit manipulations, where the scatter control elements may contain duplicates and may be associated with a mask. As illustrated in FIG. 14A, a source vector register (zmm_val) 1410 stores a plurality of source vector data elements (e.g., A-F). A scatter control register (zmm_scatter_ctrl) 1420 stores a set of scatter control elements. In one embodiment, the set of scatter control elements contains duplicate values, such as value "0" that appears at index 1 and 3, and value "3" that appears at index 2 and 4, of the scatter control register (zmm_scatter_ctrl) 1420. A mask register (k_orig_mask) 1430 stores a plurality of mask bits, each mask bit corresponding to a scatter control element in the scatter control register (zmm_scatter_ctrl) 1420. In one embodiment, a mask bit set to "1" indicates that the corresponding scatter control element is unmasked while a mask bit set to "0" indicates that the corresponding scatter control element is to be masked. An all-ones register (zmm_all_1s) 1440 stores a plurality of packed elements, each of which has its lowest bit offset (i.e., bit offset 0) set to "1". In the first uop, a shift instruction, such as a VPSLLV instruction, performs a shift on each of the unmasked packed elements stored in the all-ones register 1440. The amount of the shift (i.e., shift factor) for each unmasked packed element is defined by a corresponding element in the scatter control vector 1420. For example, bits 0, 1, 2, and 3 of the mask register (k_orig_mask) 1430 are set to 1 (i.e., unmasked), thus the corresponding packed elements (i.e. data elements 0, 1, 2, and 3) in the all-ones register are shifted by the amount indicated by the scatter control (i.e., 1, 0, 3, and 0 respectively). On the other hand, bits 4 and 5 of the mask register (k_orig_mask) 1430 are set to 0 (i.e., masked), and as such, the corresponding packed elements (i.e., data elements 4 and 5) are zeroed out. In one embodiment, the corresponding masked packed elements are zeroed out on stage of counting VHLZCNT. The result of executing the VPSLLV instruction is stored in an intermediate vector register (zmm2) 1450.

Referring to FIG. 14B, in the second uop, an instruction, such as VHLZCNT, scans across all data elements in vector register zmm2 1450 at each bit offset to find the last data element that has a value "1" set at the bit position corresponding to the bit offset. In one embodiment, the last data element is the data element with the highest index. This set bit may be referred to as the indicator bit for that bit offset. Once an indicator bit is found for a bit offset, the number of leading zeros across the data elements from that indicator bit is determined. For instance, the data elements 1 and 3 in register zmm2 both have a "1" set at bit offset 0 while data elements 0, 2, 4, and 5 have a "0" set at their respect bit offset 0. According to an embodiment, since data element 3 has a higher index than data element 1, data element 3 is considered the last data element. As such, from the indicator bit found in bit offset 0 of data element 3, the number of zeros that appear at the same bit offset (i.e., 0) in any higher-indexed data elements is counted. According to an embodiment, higher indexed data elements contain more significant bits. For example, relative to the "1" found at bit offset 0 of data element 3, there are two higher-indexed data elements (i.e., data elements 4 and 5) that have the value "0" stored at the same bit offset 0. As such, a "2" is stored into a register (zmm3) 1460 at data element 0, which corresponds to bit offset 0. This is performed for every bit offset. In one embodiment, a temporary vector (tmp) 1455 is used to keep track of the zero count for each bit offset. The count result tracked by the temporary vector are later transferred to another vector register (e.g., zmm3) according to an embodiment.

Next, in the third uop, each of the data elements stored in register (zmm3) 1460 is subtracted from value KL-1. As noted above, KL is the number of scatter control elements, which is also equal to the number of source data elements to be scattered, since each source data element corresponds to a scatter control element. In one embodiment, a temporary vector register (zmm_all_kl-1) stores the value of KL-1 in each of its packed data elements. The vector subtraction, according to an embodiment, is performed by executing a VPSUB instruction, taking as operands registers zmm3 and zmm_all_kl-1. The result is stored in a destination register (zmm_gather_ctrl) 1480. For example, in FIG. 14B, data element 0 of the zmm3 register stores the value "2". It is subtracted from the value KL-1, which is "5," to produce a subtracted value "3." This subtracted value is then stored into a corresponding data element (i.e., data element 0) in the destination register (zmm_gather_ctrl) 1480. It is worth noting that the subtraction could result in a negative value, such as the case for data elements 2, 4, and 5.

In the fourth uop, the write mask is computed. According to an embodiment, the write mask is computed by comparing the gather control elements stored in the destination register (zmm_gather_ctrl) with a constant vector consisting of all "−1" values (zmm_all_−1s) 1472. A VPCMPNEQ instruction is used, in one embodiment, to perform this comparison. The results from this comparison is stored in a mask register (k1) 1490. For example, in FIG. 14B, the values of the gather control elements in data elements 2, 4, and 5 are all "−1", as such, the corresponding mask bit(s) in the mask register are set to "0." In contrast, the values of the gather control elements in data lanes 0, 1, and 3 are not "−1." As such, the corresponding mask bit(s) in the mask register are set to "1."

In the fifth uop, the resulting gather control elements and the mask bits are then used for final permutation stage of sorting sequence by an in-register gather instruction, such as the VPERM instruction. Vector 1492 shows the permuted source data elements produced by the in-register gather instruction using the generated gather control elements and write mask bits. The permuted source data elements in vector 1492 are the same as desired result (i.e., 1350) shown back in FIG. 13.

Figure 15:
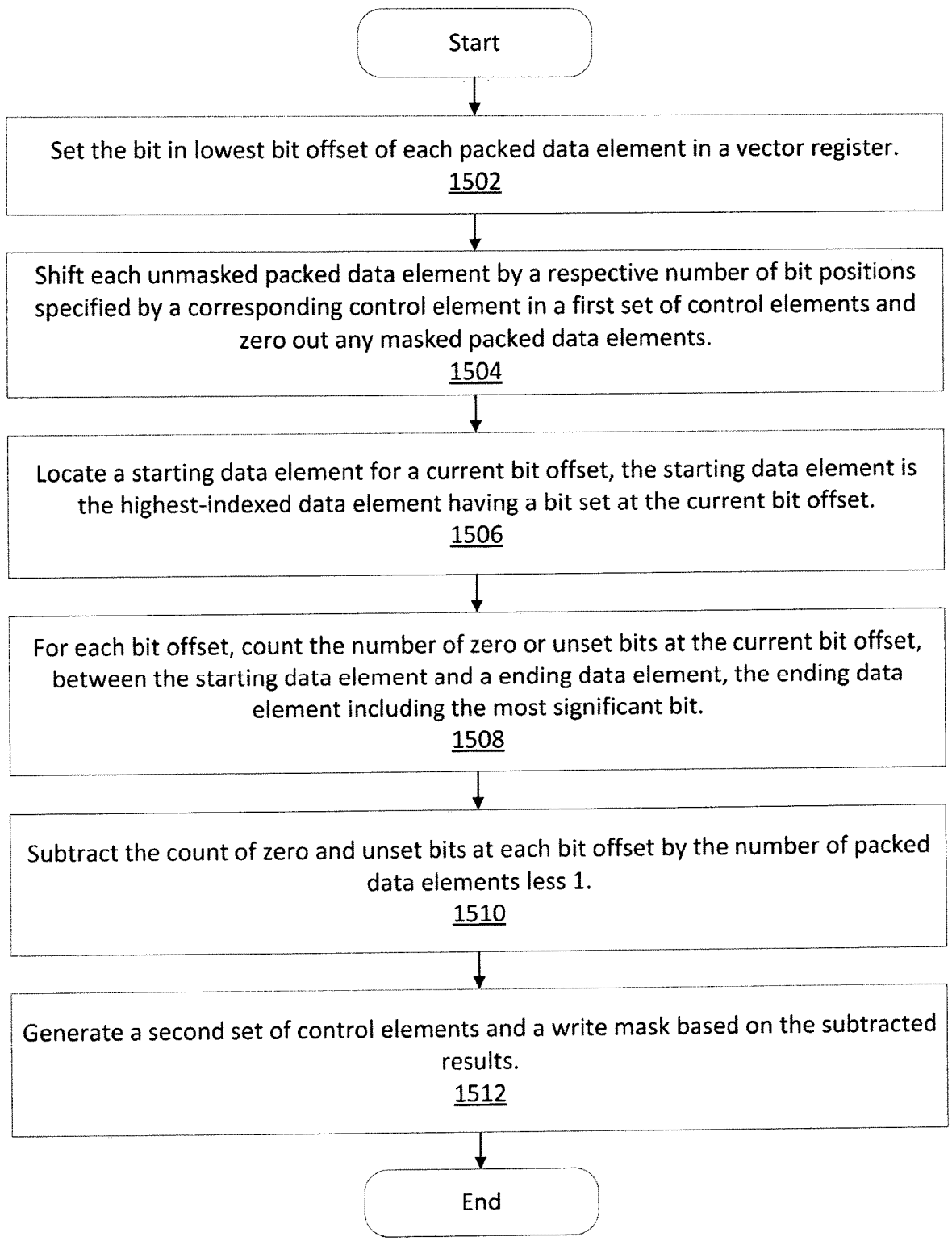
FIG. 15 is a flow chart illustrating an embodiment of the operations and logic for converting scatter control elements to gather control elements.

FIG. 15 is a flow chart illustrating an embodiment of the operations and logic for converting scatter control elements to gather control elements. According to an embodiment, the conversion is performed by a vector data scatter-to-gather conversion logic. At block 1502, the bit with the lowest bit offset in each data element of a vector register is set (e.g., set to 1) while bits in all other bit offsets are unset (e.g. set to 0). At block 1504, each data element in the vector register is shifted by a respective number of bit positions specified by a corresponding control element in a first set of control elements. According to an embodiment, the first set of control elements comprises scatter control elements to be used in the execution of an in-register scatter instruction. In one embodiment, only the data elements that are not masked by a corresponding mask bit are shifted. In some embodiments, the data elements that are masked are zeroed out. At block 1506, a starting data element in the vector register is located for each bit offset. According to an embodiment, the starting data element for a bit offset is the last data element, or the highest-indexed data element, that has a bit set at that bit offset. At block 1508, the number of zero-bits or unset bits between the starting data element and an ending data element at a particular bit offset is counted. In one embodiment, the ending data element is the data element that has the most significant bit. At block 1510, the count results collected from each bit offset are subtracted by the number of packed data elements less 1 (i.e., KL−1). At block 1512, the results of the subtraction are used to define or generate a second set of control elements and a write mask. The second set of control elements and the write mask, according to an embodiment, comprise the gather control elements and mask to be used in the execution of a masked in-register gather instruction.

One embodiment of the present invention is a method that includes decoding an instruction having a field for a source vector operand storing a plurality of data elements. Each of the data element includes a set bit and a plurality of unset bits. Each of the set bits is set at a unique bit offset within the respective data element. The method further includes executing the decoded instruction by generating, for each bit offset across the plurality of data elements in the source vector operand, a count of unset bits between a first data element having a bit set at a current bit offset and a second data element comprising a least significant bit (LSB). In one embodiment, the generation of the count of unset bits for each bit offset further includes the use of a temporary vector that has a plurality of counters. Each of the plurality of counters corresponds to one bit offset across the plurality of data elements in the source vector operand. Each counter is incremented when a bit in a current data element is unset at the bit offset corresponding to the counter, and reset to zero when the bit in the current data element is set at the bit offset corresponding to the counter. In one embodiment, the unique bit offset for each data element is determined based on a first set of control elements that is used for performing an in-register scatter of a set of packed data elements. Each of the first set of control elements corresponds to one of the plurality of data elements in the source vector operand. According to an embodiment, each data element of the source vector operand initially has a bit set at a lowest bit offset and then each data element is to be bit-shifted based on a corresponding control element from the first set of control elements. In one embodiment, a second set of control elements is generated based on the count of unset bits generated for each bit offset, the second set of control elements is useable to perform in-register gather of the set of packed data elements to achieve the same result as if an in-register scatter is performed on the set of packed data elements using the first set of control elements.

Another embodiment of the present invention is a method that includes decoding an instruction having a field for a source vector operand storing a plurality of data elements. Each of the data elements includes at most one set bit and a plurality of unset bits. The method further includes executing the decoded instruction by generating, for each bit offset across the plurality of data elements in the source vector operand, a count of unset bits between a first data element having a bit set at a current bit offset and a second data element comprising most significant bit (MSB). According to the embodiment, the first data element is a highest-indexed data element having the bit set at the current bit offset. In one embodiment, the generation of the count of unset bits for each bit offset further includes the use of a temporary vector that has a plurality of counters. Each of counters corresponds to one bit offset across the plurality of data elements in the source vector operand. Each counter is incremented when a bit in a current data element is unset at the bit offset corresponding to the counter, and reset to zero when the bit in the current data element is set at the bit offset corresponding to the counter. In one embodiment, the bit offset at which a bit is set is determined based on a first set of control elements for performing in-register scatter of a set of packed data elements. Each of the first set of control elements corresponds to one of the plurality of data elements in the source vector operand. According to an embodiment, each data element of the source vector operand initially has a bit set at a lowest bit offset and each data element is to be bit-shifted based on a corresponding control element from the first set of control elements. In one embodiment, each data element of the source vector operand further corresponds to one of a plurality of mask bits stored in a mask register, such that each data element is to be bit-shifted only if a corresponding mask bit is set. In one embodiment, a second set of control elements is generated based on the count of unset bits generated for each bit offset, the second set of control elements useable to perform in-register gather of the set of packed data elements to achieve a same result as performing the in-register scatter using the first set of control elements. In addition, a set of write mask bits may also be generated based on the count of unset bits generated for each bit offset.

Another embodiment of the present invention is a processor that includes a decoder circuitry and an execution circuitry. The decoder circuitry to decode an instruction having a field for a source vector operand storing a plurality of data elements. Each of the data elements includes a set bit and a plurality of unset bits. Each of the set bits is set at a unique bit offset within a respective data element. The execution circuitry to execute the decoded instruction by generating, for each bit offset across the plurality of data elements in the source vector operand, a count of unset bits from a first data element having a bit set at a current bit offset to a second data element comprising a least significant bit (LSB). In one embodiment, the generation of the count of unset bits for each bit offset further includes the use of a temporary vector having a plurality of counters. Each of the plurality of counters corresponds to one bit offset across the plurality of data elements in the source vector operand. Each counter is incremented when a bit in a current data element is unset at the bit offset corresponding to the counter, and reset to zero when the bit in the current data element is set at the bit offset corresponding to the counter. In one embodiment, the unique bit offset for each data element is determined based on a first set of control elements that is used for performing an in-register scatter of a set of packed data elements. Each of the first set of control elements corresponds to one of the plurality of data elements in the source vector operand. According to an embodiment, each data element of the source vector operand initially has a bit set at a lowest bit offset and then each data element is to be bit-shifted based on a corresponding control element from the first set of control elements. In one embodiment, a second set of control elements is generated based on the count of unset bits generated for each bit offset, the second set of control elements is useable to perform in-register gather of the set of packed data elements to achieve the same result as if an in-register scatter is performed on the set of packed data elements using the first set of control elements.

Yet another embodiment of the present invention is a processor that includes a decoder circuitry to decode an instruction having a field for a source vector operand storing a plurality of data elements. Each data element comprising at most one set bit and a plurality of unset bits. The processor further includes an execution circuitry to execute the decoded instruction by generating, for each bit offset across the plurality of data elements in the source vector operand, a count of unset bits from a first data element having a bit set at the bit offset to a second data element comprising most significant bit (MSB). According to an embodiment, the first data element is a highest indexed data element having the bit set at the bit offset. In one embodiment, the generation of the count of unset bits for each bit offset further includes the use of a temporary vector that has a plurality of counters. Each of counters corresponds to one bit offset across the plurality of data elements in the source vector operand. Each counter is incremented when a bit in a current data element is unset at the bit offset corresponding to the counter, and reset to zero when the bit in the current data element is set at the bit offset corresponding to the counter. In one embodiment, the bit offset at which a bit is set is determined based on a first set of control elements for performing in-register scatter of a set of packed data elements. Each of the first set of control elements corresponds to one of the plurality of data elements in the source vector operand. According to an embodiment, each data element of the source vector operand initially has a bit set at a lowest bit offset and each data element is to be bit-shifted based on a corresponding control element from the first set of control elements. In one embodiment, each data element of the source vector operand further corresponds to one of a plurality of mask bits stored in a mask register, such that each data element is to be bit-shifted only if a corresponding mask bit is set. In one embodiment, a second set of control elements is generated based on the count of unset bits generated for each bit offset, the second set of control elements useable to perform in-register gather of the set of packed data elements to achieve a same result as performing the in-register scatter using the first set of control elements. In addition, a set of write mask bits may also be generated based on the count of unset bits generated for each bit offset.

Figure 16:
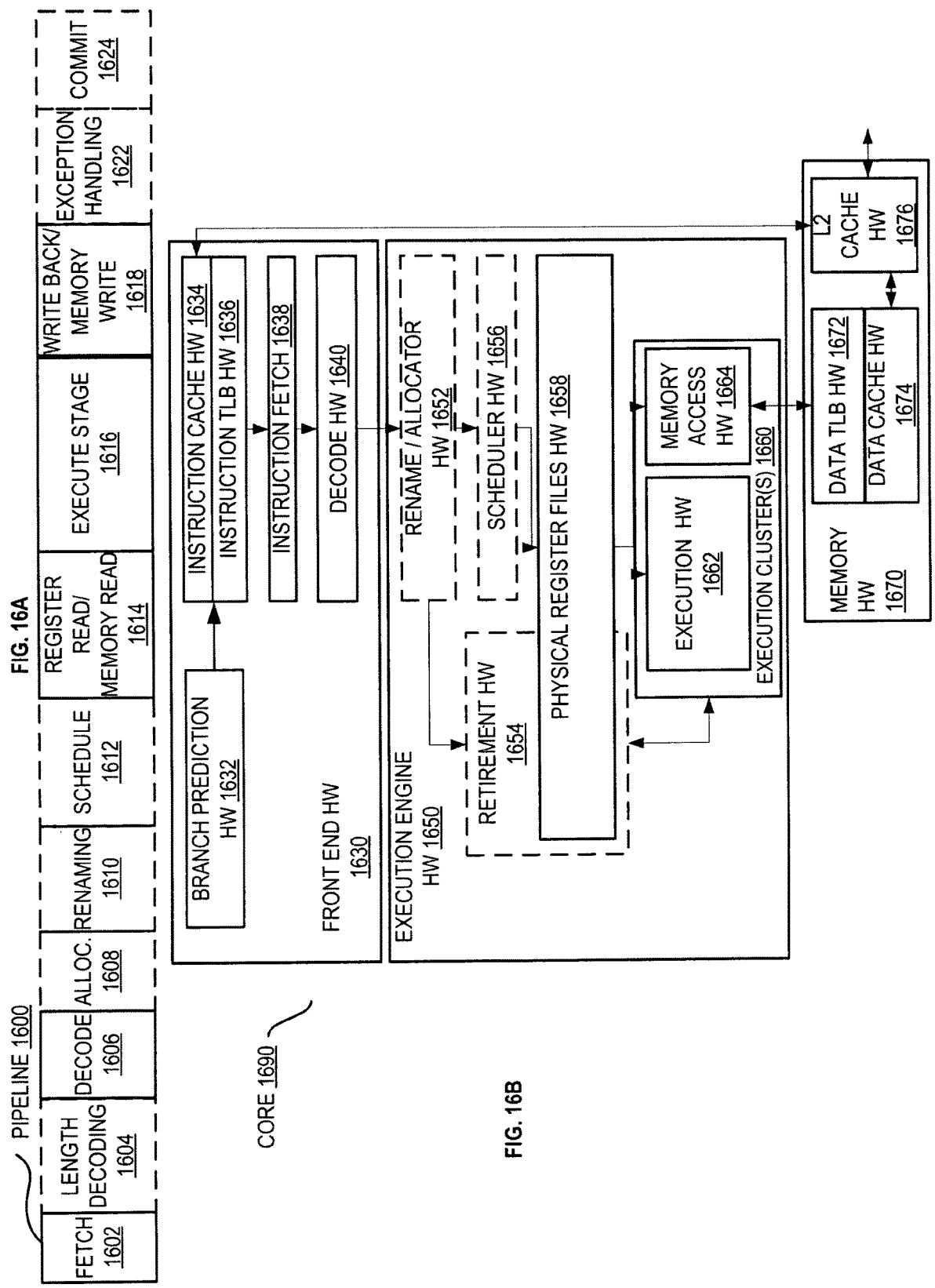
FIG. 16A is a block diagram illustrating both an exemplary in-order pipeline and an exemplary register renaming, out-of-order issue/execution pipeline according to embodiments of the invention.
FIG. 16B is a block diagram illustrating both an exemplary embodiment of an in-order architecture core and an exemplary register renaming, out-of-order issue/execution architecture core to be included in a processor according to embodiments of the invention.

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end hardware 1630 coupled to an execution engine hardware 1650, and both are coupled to a memory hardware 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end hardware 1630 includes a branch prediction hardware 1632 coupled to an instruction cache hardware 1634, which is coupled to an instruction translation lookaside buffer (TLB) 1636, which is coupled to an instruction fetch hardware 1638, which is coupled to a decode hardware 1640. The decode hardware 1640 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode hardware 1640 or otherwise within the front end hardware 1630). The decode hardware 1640 is coupled to a rename/allocator hardware 1652 in the execution engine hardware 1650.

The execution engine hardware 1650 includes the rename/allocator hardware 1652 coupled to a retirement hardware 1654 and a set of one or more scheduler hardware 1656. The scheduler hardware 1656 represents any number of different schedulers, including reservations stations, central instruction window, etc. The scheduler hardware 1656 is coupled to the physical register file(s) hardware 1658. Each of the physical register file(s) hardware 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1658 comprises a vector registers hardware, a write mask registers hardware, and a scalar registers hardware. This register hardware may provide architectural vector registers, vector mask registers, and general purpose registers. The physical register file(s) hardware 1658 is overlapped by the retirement hardware 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1654 and the physical register file(s) hardware 1658 are coupled to the execution cluster(s) 1660. The execution cluster(s) 1660 includes a set of one or more execution hardware 1662 and a set of one or more memory access hardware 1664. The execution hardware 1662 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1656, physical register file(s) hardware 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1664). It should also be understood that where separate pipelines are used, one or more of these pipelines may be out-of-order issue/execution and the rest in-order.

The set of memory access hardware 1664 is coupled to the memory hardware 1670, which includes a data TLB hardware 1672 coupled to a data cache hardware 1674 coupled to a level 2 (L2) cache hardware 1676. In one exemplary embodiment, the memory access hardware 1664 may include a load hardware, a store address hardware, and a store data hardware, each of which is coupled to the data TLB hardware 1672 in the memory hardware 1670. The instruction cache hardware 1634 is further coupled to a level 2 (L2) cache hardware 1676 in the memory hardware 1670. The L2 cache hardware 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode hardware 1640 performs the decode stage 1606; 3) the rename/allocator hardware 1652 performs the allocation stage 1608 and renaming stage 1610; 4) the scheduler hardware 1656 performs the schedule stage 1612; 5) the physical register file(s) hardware 1658 and the memory hardware 1670 perform the register read/memory read stage 1614; the execution cluster 1660 perform the execute stage 1616; 6) the memory hardware 1670 and the physical register file(s) hardware 1658 perform the write back/memory write stage 1618; 7) various hardware may be involved in the exception handling stage 1622; and 8) the retirement hardware 1654 and the physical register file(s) hardware 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1634/1674 and a shared L2 cache hardware 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 17:
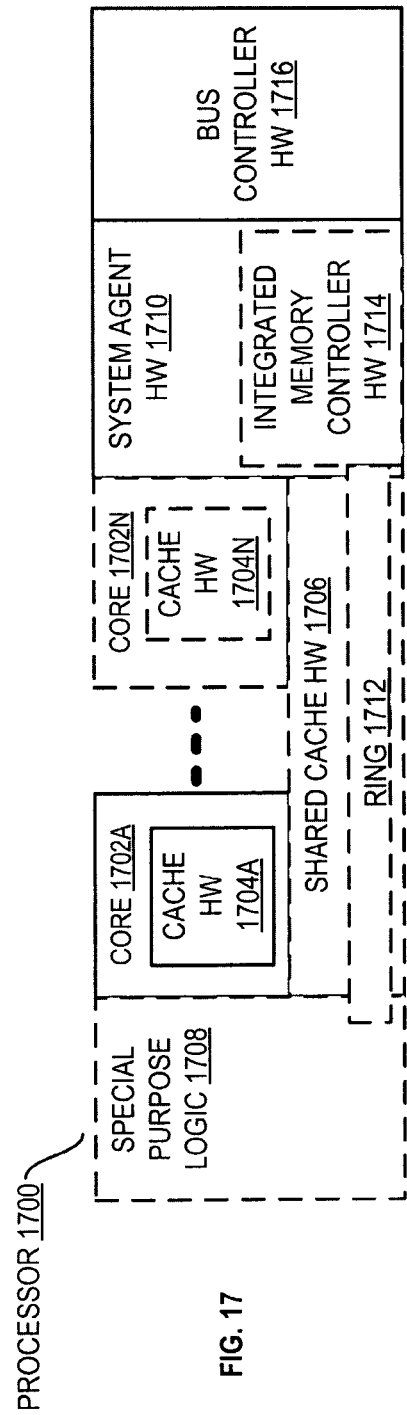
FIG. 17 is a block diagram of a single core processor and a multicore processor with integrated memory controller and graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller hardware 1716, while the optional addition of the dashed lined boxes illustrates an alternative processor 1700 with multiple cores 1702A-N, a set of one or more integrated memory controller hardware 1714 in the system agent hardware 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores.

Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1706, and external memory (not shown) coupled to the set of integrated memory controller hardware 1714. The set of shared cache hardware 1706 may include one or more mid-level caches, such as level 2 (L2), level 3 (L3), level 4 (L4), or other levels of cache, a last level cache (LLC), and/or combinations thereof. While in one embodiment a ring based interconnect hardware 1712 interconnects the integrated graphics logic 1708, the set of shared cache hardware 1706, and the system agent hardware 1710/integrated memory controller hardware 1714, alternative embodiments may use any number of well-known techniques for interconnecting such hardware. In one embodiment, coherency is maintained between one or more cache hardware 1706 and cores 1702-A-N.

In some embodiments, one or more of the cores 1702A-N are capable of multi-threading. The system agent 1710 includes those components coordinating and operating cores 1702A-N. The system agent hardware 1710 may include for example a power control unit (PCU) and a display hardware. The PCU may be or include logic and components needed for regulating the power state of the cores 1702A-N and the integrated graphics logic 1708. The display hardware is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set. In one embodiment, the cores 1702A-N are heterogeneous and include both the "small" cores and "big" cores described below.

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
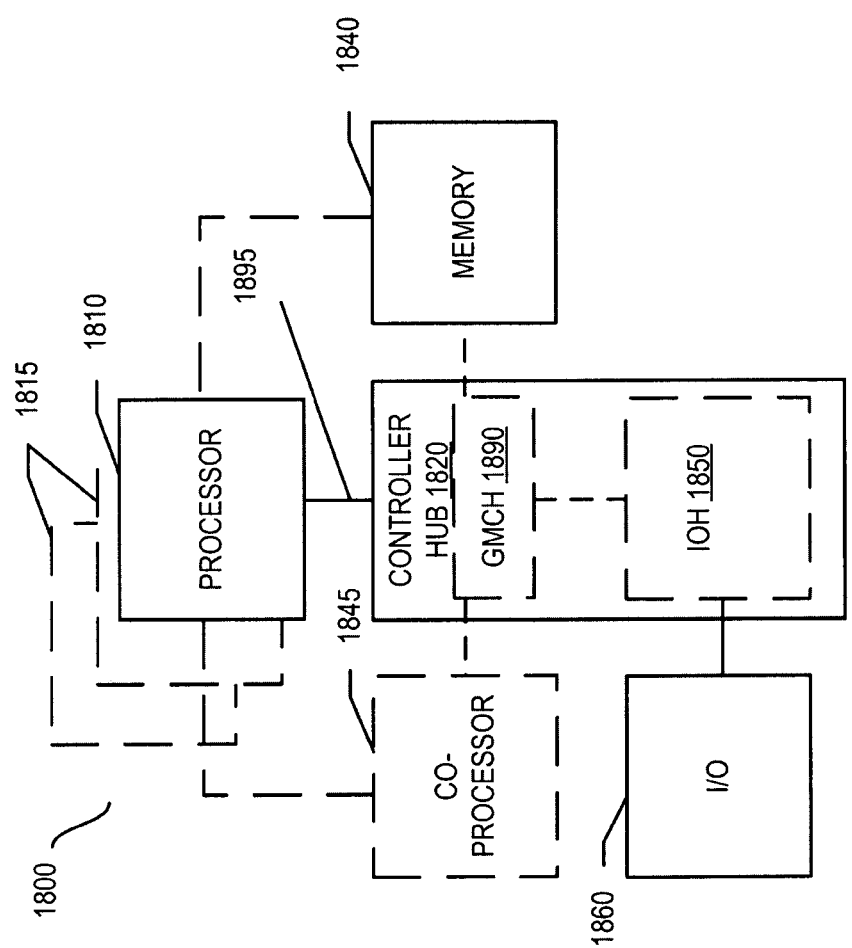
FIG. 18 illustrates a block diagram of a system in accordance with one embodiment of the present invention.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface, or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
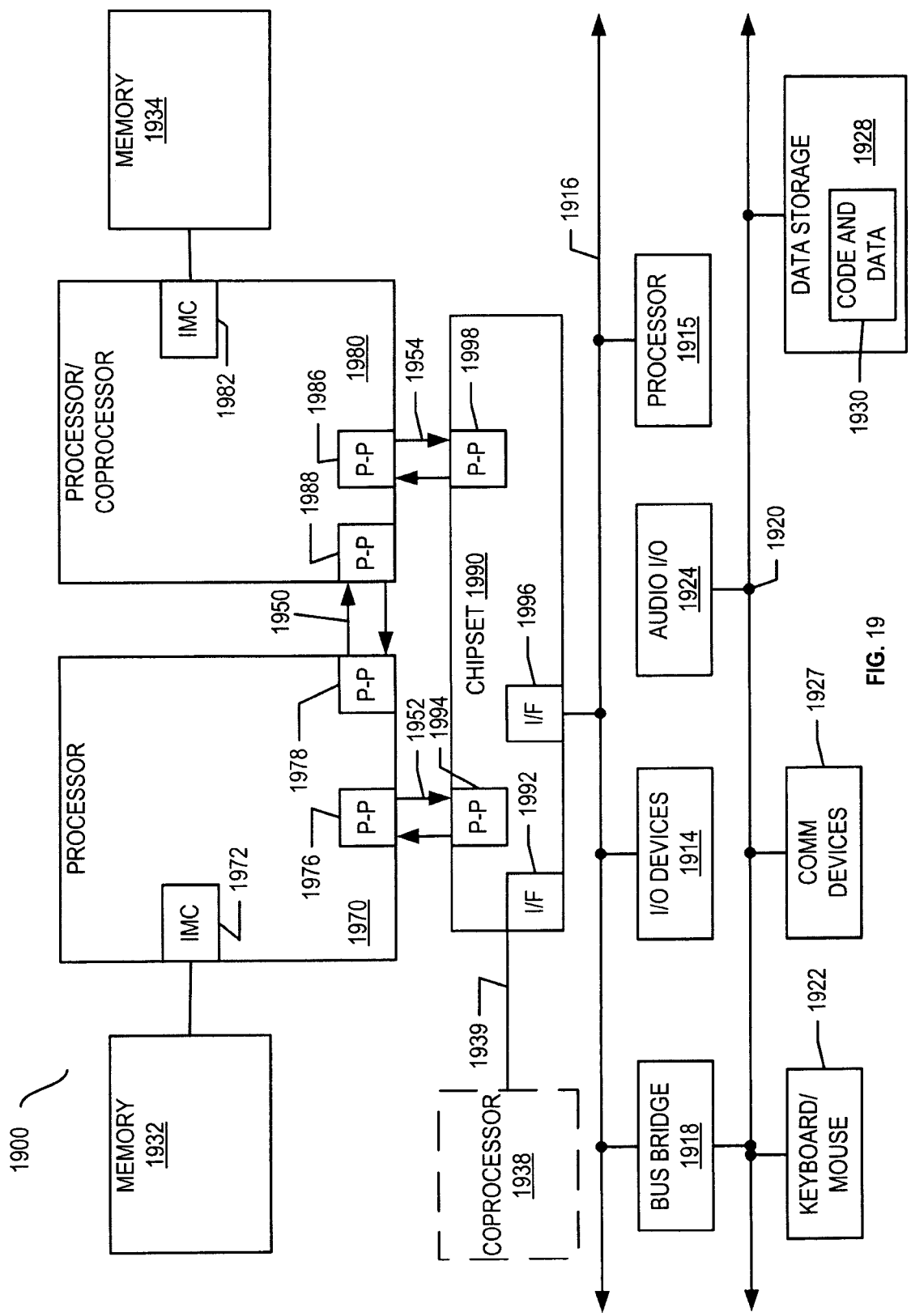
FIG. 19 illustrates a block diagram of a second system in accordance with an embodiment of the present invention.

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) hardware 1972 and 1982, respectively. Processor 1970 also includes as part of its bus controller hardware point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) hardware), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage hardware 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
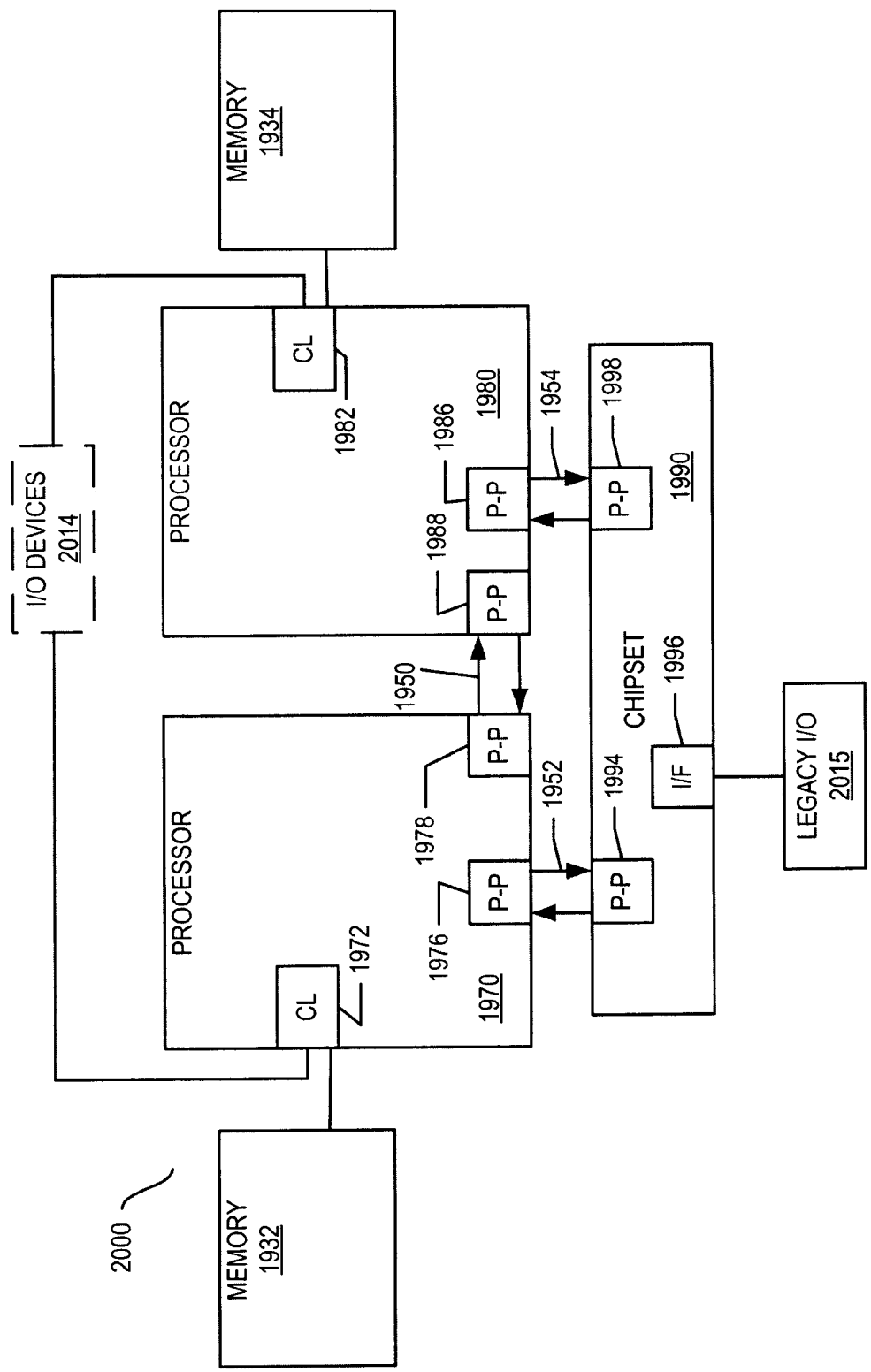
FIG. 20 illustrates a block diagram of a third system in accordance with an embodiment of the present invention.

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller hardware and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
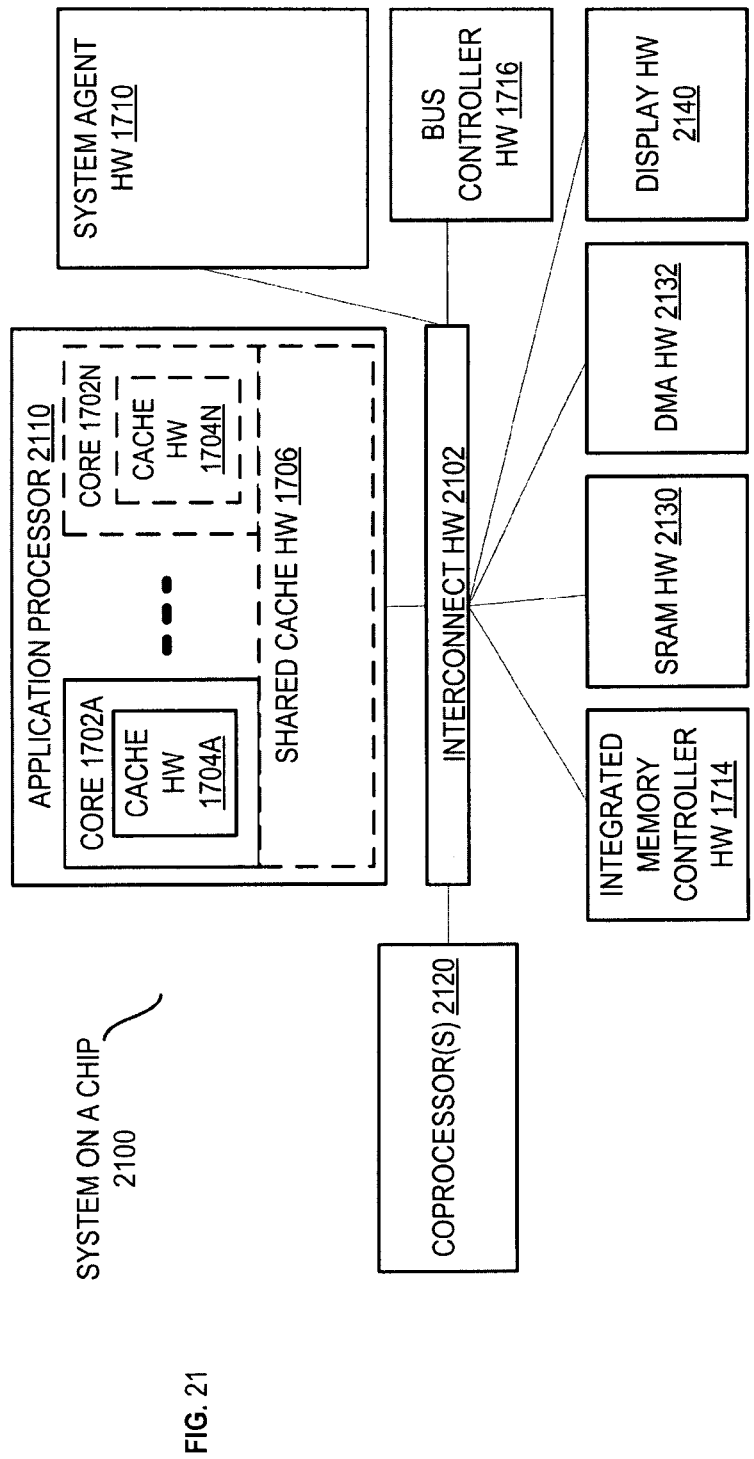
FIG. 21 illustrates a block diagram of a system on a chip (SoC) in accordance with an embodiment of the present invention.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect hardware 2102 is coupled to: an application processor 2110 which includes a set of one or more cores 1702A-N and shared cache hardware 1706; a system agent hardware 1710; a bus controller hardware 1716; an integrated memory controller hardware 1714; a set or one or more coprocessors 2120 which may include integrated graphics logic, an image processor, an audio processor, and a video processor; an static random access memory (SRAM) hardware 2130; a direct memory access (DMA) hardware 2132; and a display hardware 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
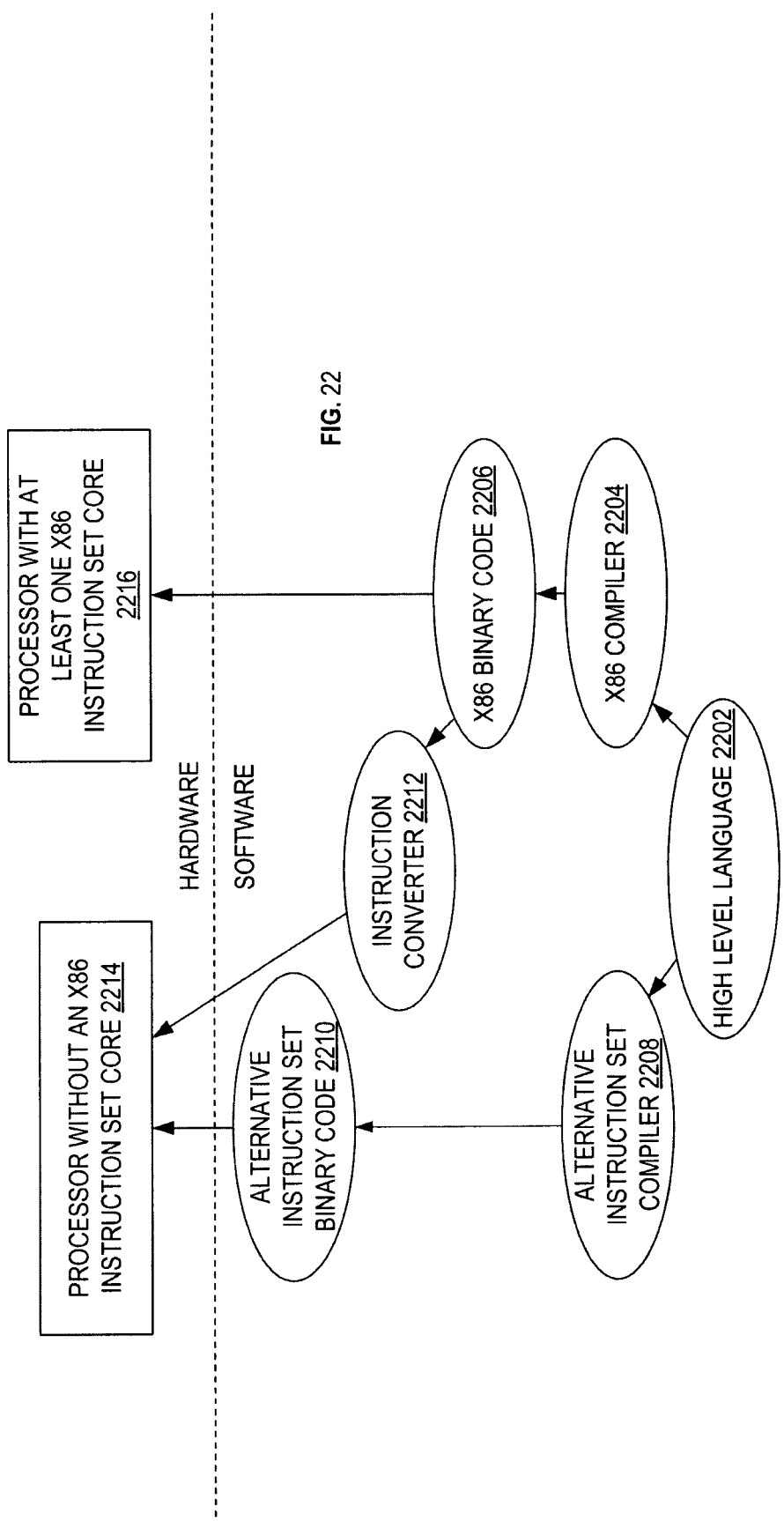
FIG. 22 illustrates a block diagram contrasting the use of a software instruction converter to convert binary instructions in a source instruction set to binary instructions in a target instruction set according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
  decoding an instruction having a field for a source vector operand storing a plurality of data elements, each data element comprising a set bit and a plurality of unset bits, each of the set bits set at a unique bit offset, wherein the unique bit offset for each data element is determined based on a first set of control elements for performing in-register scatter of a set of packed data elements, each of the first set of control elements corresponding to one of the plurality of data elements in the source vector operand; and
  executing the decoded instruction by generating, for each bit offset across the plurality of data elements in the source vector operand, a count of unset bits at a current bit offset starting with a first data element having a bit set at the current bit offset to a second data element comprising a least significant bit (LSB) of the source vector operand,
wherein a second set of control elements is generated based on the count of unset bits generated for each bit offset, the second set of control elements useable to perform in-register gather of the set of packed data elements to achieve a same result as performing the in-register scatter using the first set of control elements.

2. The method of claim 1, wherein generating the count of unset bits for each bit offset comprises using a temporary vector having a plurality of counters, each counter corresponding to one bit offset across the plurality of data elements in the source vector operand, each counter is:
incremented when a bit in a current data element is unset at the bit offset corresponding to the counter; and
reset to zero when the bit in the current data element is set at the bit offset corresponding to the counter.

3. The method of claim 1, wherein each data element of the source vector operand initially has a bit set at a lowest bit offset and then each data element is to be bit-shifted based on a corresponding control element from the first set of control elements.

4. A method comprising:
decoding an instruction having a field for a source vector operand storing a plurality of data elements, each data element comprising at most one set bit and a plurality of unset bits, wherein the bit offset of each set bit is determined based on a first set of control elements for performing in-register scatter of a set of packed data elements, each of the first set of control elements corresponding to one of the plurality of data elements in the source vector operand; and
executing the decoded instruction by generating, for each bit offset across the plurality of data elements in the source vector operand, a count of unset bits at a current bit offset starting with a first data element having a bit set at the current bit offset to a second data element comprising a most significant bit (MSB) of the source vector operand, wherein the first data element is a highest-indexed data element having the bit set at the current bit offset,
wherein a second set of control elements is generated based on the count of unset bits generated for each bit offset, the second set of control elements useable to perform in-register gather of the set of packed data elements to achieve a same result as performing the in-register scatter using the first set of control elements.

5. The method of claim 4, wherein generating the count of unset bits for each bit offset comprises using a temporary vector having a plurality of counters, each counter corresponding to one bit offset across the plurality of data elements in the source vector operand, each counter is:
incremented when a bit in a current data element is unset at the bit offset corresponding to the counter; and
reset to zero when the bit in the current data element is set at the bit offset corresponding to the counter.

6. The method of claim 1, wherein each data element of the source vector operand initially has a bit set at a lowest bit offset and each data element is to be bit-shifted based on a corresponding control element from the first set of control elements.

7. The method of claim 6, wherein each data element corresponds to a mask bit stored in a mask register, and each data element is to be bit-shifted only if a corresponding mask bit is set.

8. The method of claim 6, wherein a set of write mask bits is generated based on the count of unset bits generated for each bit offset.

9. A processor comprising:
a decoder circuitry to decode an instruction having a field for a source vector operand storing a plurality of data elements, each data element comprising a set bit and a plurality of unset bits, each of the set bits set at a unique bit offset within a respective data element wherein the unique bit offset for each data element is determined based on a first set of control elements for performing in-register scatter of a set of packed data elements, each of the first set of control elements corresponding to one of the plurality of data elements in the source vector operand; and
an execution circuitry to execute the decoded instruction by generating, for each bit offset across the plurality of data elements in the source vector operand, a count of unset bits at a current bit offset starting from a first data element having a bit set at the current bit offset to a second data element comprising a least significant bit (LSB) of the source vector operand,
wherein a second set of control elements is generated based on the count of unset bits generated for each bit offset, the second set of control elements useable to perform in-register gather of the set of packed data elements to achieve a same result as performing the in-register scatter using the first set of control elements.

10. The processor of claim 9, wherein generating the count of unset bits for each bit offset comprises using a temporary vector having a plurality of counters, each counter corresponding to one bit offset across the plurality of data elements in the source vector operand, each counter is:
incremented when a bit in a current data element is unset at the bit offset corresponding to the counter; and
reset to zero when the bit in the current data element is set at the bit offset corresponding to the counter.

11. The processor of claim 9, wherein each data element of the source vector operand initially has a bit set at a lowest bit offset and then each data element is to be bit-shifted based on a corresponding control element from the first set of control elements.

12. A processor comprising:
a decoder circuitry to decode an instruction having a field for a source vector operand storing a plurality of data elements, each data element comprising at most one set bit and a plurality of unset bit, wherein the bit offset of each set bit is determined based on a first set of control elements for performing in-register scatter of a set of packed data elements, each of the first set of control elements corresponding to one of the plurality of data elements in the source vector operands; and
an execution circuitry to execute the decoded instruction by generating, for each bit offset across the plurality of data elements in the source vector operand, a count of unset bits at a current bit offset starting from a first data element having a bit set at the current bit offset to a second data element comprising a most significant bit (MSB) of the source vector operand, wherein the first data element is a highest indexed data element having the bit set at the bit offset,
wherein a second set of control elements is generated based on the count of unset bits generated for each bit offset, the second set of control elements useable to perform in-register gather of the set of packed data elements to achieve a same result as performing the in-register scatter using the first set of control elements.

13. The processor of claim 12, wherein generating the count of unset bits for each bit offset comprises using a temporary vector having a plurality of counters, each counter corresponding to one bit offset across the plurality of data elements in the source vector operand, each counter is:
- incremented when a bit in a current data element is unset at the bit offset corresponding to the counter; and
- reset to zero when the bit in the current data element is set at the bit offset corresponding to the counter.

14. The processor of claim 12, wherein each data element of the source vector operand initially has a bit set at a lowest bit offset and each data element is to be bit-shifted based on a corresponding control element from the first set of control elements.

15. The processor of claim 14, wherein each data element corresponds to a mask bit stored in a mask register, and each data element is to be bit-shifted only if a corresponding mask bit is set.

16. The processor of claim 14, wherein a set of write mask bits is generated based on the count of unset bits generated for each bit offset.

* * * * *